(12) United States Patent
Smets et al.

(10) Patent No.: US 12,486,478 B2
(45) Date of Patent: Dec. 2, 2025

(54) CONSUMER PRODUCTS COMPRISING DELIVERY PARTICLES WITH HIGH CORE:WALL RATIOS

(71) Applicant: The Procter & Gamble Company, Cincinnati, OH (US)

(72) Inventors: Johan Smets, Lubbeek (BE); An Pintens, Brasschaat (BE); Joana Andreia Lameiras Domingues, Brussels (BE); Fadi Selim Chakar, Neenah, WI (US); Linsheng Feng, Menasha, WI (US); Presley Genevie Neuman, Appleton, WI (US); Robert Stanley Bobnock, Menasha, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 532 days.

(21) Appl. No.: 17/500,978

(22) Filed: Oct. 14, 2021

(65) Prior Publication Data

US 2023/0120922 A1  Apr. 20, 2023

Related U.S. Application Data

(60) Provisional application No. 63/092,528, filed on Oct. 16, 2020.

(51) Int. Cl.
| | | |
|---|---|---|
| *C11D 17/00* | (2006.01) | |
| *B01J 13/18* | (2006.01) | |
| *C11D 3/37* | (2006.01) | |
| *C11D 3/50* | (2006.01) | |
| *C11D 17/06* | (2006.01) | |

(52) U.S. Cl.
CPC ............ *C11D 3/505* (2013.01); *B01J 13/185* (2013.01); *C11D 3/3761* (2013.01); *C11D 2111/12* (2024.01)

(58) Field of Classification Search
None
See application file for complete search history.

(56) References Cited

U.S. PATENT DOCUMENTS

| | | |
|---|---|---|
| 2,396,278 A | 3/1946 | Otto |
| 2,438,091 A | 3/1948 | Lynch |
| 2,486,921 A | 11/1949 | Byerly |
| 2,486,922 A | 11/1949 | Bruce |
| 2,528,378 A | 10/1950 | Mccabe, Jr. |
| 2,658,072 A | 11/1953 | Kosmin |
| 2,730,456 A | 1/1956 | Green |
| 2,730,457 A | 1/1956 | Green |
| 2,800,457 A | 7/1957 | Green |
| 2,800,458 A | 7/1957 | Green |
| 2,809,971 A | 10/1957 | Jack |
| 2,826,551 A | 3/1958 | Geen |
| RE24,899 E | 11/1960 | Green |
| 3,049,509 A | 8/1962 | Hardy et al. |
| 3,236,733 A | 2/1966 | Karsten |
| 3,332,880 A | 7/1967 | Adriaan |
| 3,429,827 A | 2/1969 | Ruus |
| 3,516,941 A | 6/1970 | Matson |
| 3,660,304 A | 5/1972 | Matsukawa |
| 3,681,248 A | 8/1972 | Gould |
| 3,691,140 A | 9/1972 | Silver |
| 3,753,196 A | 8/1973 | Kurtz |
| 3,761,418 A | 9/1973 | Parran |
| 3,772,215 A | 11/1973 | Gould |
| 3,826,756 A | 7/1974 | Bachmann |
| 3,886,085 A | 5/1975 | Kiritani |
| 3,898,039 A | 8/1975 | Lin |
| 3,920,819 A | 11/1975 | Stephens |
| 3,929,678 A | 12/1975 | Laughlin et al. |
| 3,958,581 A | 5/1976 | Abegg |
| 3,962,418 A | 6/1976 | Birkofer |
| 3,964,500 A | 6/1976 | Drakoff |
| 3,965,033 A | 6/1976 | Matsukawa |
| 4,001,140 A | 1/1977 | Foris |
| 4,046,750 A | 9/1977 | Rembaum |
| 4,062,799 A | 12/1977 | Matsukawa |
| 4,075,134 A | 2/1978 | Morehouse, Jr. |
| 4,081,376 A | 3/1978 | Strub |
| 4,087,376 A | 5/1978 | Foris |
| 4,089,802 A | 5/1978 | Foris |
| 4,093,556 A | 6/1978 | Wojciak |
| 4,100,103 A | 7/1978 | Foris |
| 4,105,823 A | 8/1978 | Hasler |

(Continued)

FOREIGN PATENT DOCUMENTS

| | | |
|---|---|---|
| AU | 2616292 A | 4/1993 |
| CN | 101088567 A | 12/2007 |

(Continued)

OTHER PUBLICATIONS

15906 PCT Search Report and Written Opinion for PCT/US2021/071856 dated Mar. 2, 2022, 19 pages.
"Aluminum Silicate Powder from Reade", retrieved on Jul. 23, 2014, pp. 1-2.
All Office Actions; U.S. Appl. No. 17/500,974, filed Oct. 14, 2021.
All Office Actions; U.S. Appl. No. 17/500,975, filed Oct. 14, 2021.
Brunauer, et al., "Absorption of Gases in Multimolecular Layers", Journal of the American Chemical Society, vol. 60, 1938, pp. 309-319.
Cayer, "Polymer-based Functional Particulates: Design, Syntheses and Applications", Nov. 11, 2014, XP055249238, 44pgs.
Celvol Polyvinyl Alcohol . . . A Versatile High-Performance Polymer, Internet Citation, Jan. 1, 2007, pp. 1-16, XP002632184, Retrieved from the Internet: URL: http://www.celanese.com/celvol_polyvinyl_alcohol.pdf [retrieved on Apr. 8, 2011] the whole document.

(Continued)

*Primary Examiner* — Lorna M Douyon
(74) *Attorney, Agent, or Firm* — Carolyn S. Powell; George H. Leal

(57) ABSTRACT

Consumer products that include treatment adjuncts and delivery particles having certain sizes, certain monomers (for example, multifunctional (meth)acrylate monomers), and certain core:wall polymer weight ratios. Methods related to the use and manufacture of such compositions, including methods of treating a surface, such as a fabric.

21 Claims, 4 Drawing Sheets

(56) References Cited

U.S. PATENT DOCUMENTS

| | | |
|---|---|---|
| 4,145,184 A | 3/1979 | Brain |
| 4,166,152 A | 8/1979 | Baker |
| 4,183,911 A | 1/1980 | Smithies |
| 4,197,346 A | 4/1980 | Stevens |
| 4,197,865 A | 4/1980 | Jacquet |
| 4,217,914 A | 8/1980 | Jacquet |
| 4,221,710 A | 9/1980 | Hoshi |
| 4,234,627 A | 11/1980 | Schilling |
| 4,240,450 A | 12/1980 | Cauwet |
| 4,247,411 A | 1/1981 | Vanlerberghe |
| 4,251,386 A | 2/1981 | Saeki |
| 4,254,201 A | 3/1981 | Sawai et al. |
| 4,275,055 A | 6/1981 | Nachtigal |
| 4,285,720 A | 8/1981 | Scher |
| 4,323,683 A | 4/1982 | Bolich, Jr. |
| 4,345,080 A | 8/1982 | Bolich, Jr. |
| 4,356,109 A | 10/1982 | Saeki |
| 4,364,837 A | 12/1982 | Pader |
| 4,379,753 A | 4/1983 | Bolich, Jr. |
| 4,381,919 A | 5/1983 | Jacquet |
| 4,422,853 A | 12/1983 | Jacquet |
| 4,423,099 A | 12/1983 | Mueller |
| 4,428,869 A | 1/1984 | Munteanu |
| 4,430,243 A | 2/1984 | Bragg |
| 4,444,699 A | 4/1984 | Hayford |
| 4,446,032 A | 5/1984 | Munteanu |
| 4,450,123 A | 5/1984 | Egawa |
| 4,470,982 A | 9/1984 | Winkler |
| 4,507,280 A | 3/1985 | Pohl |
| 4,515,705 A | 5/1985 | Moeddel |
| 4,529,586 A | 7/1985 | De Marco et al. |
| 4,537,706 A | 8/1985 | Severson, Jr. |
| 4,537,707 A | 8/1985 | Severson, Jr. |
| 4,547,429 A | 10/1985 | Greiner |
| 4,550,862 A | 11/1985 | Barker |
| 4,552,811 A | 11/1985 | Brown |
| 4,561,997 A | 12/1985 | Roehl |
| 4,561,998 A | 12/1985 | Wertz |
| 4,574,110 A | 3/1986 | Asano |
| 4,588,639 A | 5/1986 | Ozono |
| 4,597,898 A | 7/1986 | Vander |
| 4,601,863 A | 7/1986 | Shioi |
| 4,608,250 A | 8/1986 | Jacquet |
| 4,610,927 A | 9/1986 | Igarashi |
| 4,622,267 A | 11/1986 | Riecke |
| 4,626,372 A | 12/1986 | Kaufmann et al. |
| 4,663,158 A | 5/1987 | Wolfram |
| 4,687,808 A | 8/1987 | Jarrett et al. |
| 4,708,924 A | 11/1987 | Nagai |
| 4,719,099 A | 1/1988 | Grollier |
| 4,722,865 A | 2/1988 | Huizer |
| 4,741,855 A | 5/1988 | Grote |
| 4,746,467 A | 5/1988 | Sakamoto |
| 4,754,110 A | 6/1988 | Craft |
| 4,775,656 A | 10/1988 | Harada |
| 4,780,370 A | 10/1988 | Pointier |
| 4,798,691 A | 1/1989 | Kasai |
| 4,803,947 A | 2/1989 | Ueki |
| 4,824,707 A | 4/1989 | Spector |
| 4,863,626 A | 9/1989 | Coyne |
| 4,865,759 A | 9/1989 | Coyne |
| 4,882,220 A | 11/1989 | Ono |
| 4,908,271 A | 3/1990 | Kasai |
| 4,911,851 A | 3/1990 | Ladd, Jr. |
| 4,917,920 A | 4/1990 | Ono |
| 4,919,841 A | 4/1990 | Kamel |
| 4,946,624 A | 8/1990 | Michael |
| 4,957,666 A | 9/1990 | Kawamura |
| 4,968,451 A | 11/1990 | Scheibel |
| 4,972,000 A | 11/1990 | Kawashima |
| 5,009,880 A | 4/1991 | Grollier |
| 5,061,410 A | 10/1991 | Sakamoto |
| 5,066,419 A | 11/1991 | Walley |
| 5,071,706 A | 12/1991 | Soper |
| 5,104,646 A | 4/1992 | Bolich, Jr. |
| 5,105,823 A | 4/1992 | Blum |
| 5,106,609 A | 4/1992 | Bolich, Jr. |
| 5,113,585 A | 5/1992 | Rogers |
| 5,118,756 A | 6/1992 | Asano |
| 5,120,349 A | 6/1992 | Stewart |
| 5,137,646 A | 8/1992 | Schmidt et al. |
| 5,145,675 A | 9/1992 | Won |
| 5,176,903 A | 1/1993 | Goldberg |
| 5,185,155 A | 2/1993 | Behan |
| 5,188,753 A | 2/1993 | Schmidt |
| 5,225,278 A | 7/1993 | Kielbania, Jr. |
| 5,230,822 A | 7/1993 | Kamel et al. |
| 5,232,613 A | 8/1993 | Bacon |
| 5,232,769 A | 8/1993 | Yamato |
| 5,234,611 A | 8/1993 | Trinh |
| 5,234,682 A | 8/1993 | Macchio |
| 5,277,979 A | 1/1994 | Kielbania, Jr. |
| 5,278,106 A | 1/1994 | Nakashima |
| 5,281,355 A | 1/1994 | Tsaur et al. |
| 5,292,835 A | 3/1994 | Jahns |
| RE34,584 E | 4/1994 | Grote |
| 5,324,444 A | 6/1994 | Berry |
| 5,324,445 A | 6/1994 | Langley et al. |
| 5,342,556 A | 8/1994 | Traeubel |
| 5,362,565 A | 11/1994 | Murano |
| 5,366,652 A | 11/1994 | Capeci |
| 5,370,881 A | 12/1994 | Fuisz |
| 5,380,756 A | 1/1995 | Andrews |
| 5,399,192 A | 3/1995 | Yamasoe |
| 5,407,609 A | 4/1995 | Tice |
| 5,468,473 A | 11/1995 | Mullen |
| 5,486,303 A | 1/1996 | Capeci |
| 5,487,884 A | 1/1996 | Bissett |
| 5,489,392 A | 2/1996 | Capeci |
| 5,516,448 A | 5/1996 | Capeci |
| 5,565,145 A | 10/1996 | Watson |
| 5,565,422 A | 10/1996 | Del |
| 5,569,645 A | 10/1996 | Dinniwell |
| 5,573,756 A | 11/1996 | Lambrechts |
| 5,574,005 A | 11/1996 | Welch |
| 5,575,282 A | 11/1996 | Knoch |
| 5,576,282 A | 11/1996 | Miracle |
| 5,580,578 A | 12/1996 | Oshlack |
| 5,595,967 A | 1/1997 | Miracle |
| 5,596,051 A | 1/1997 | Jahns |
| 5,597,936 A | 1/1997 | Perkins |
| 5,607,980 A | 3/1997 | Mcatee |
| 5,611,972 A | 3/1997 | Tararuj |
| 5,637,401 A | 6/1997 | Berman |
| 5,648,328 A | 7/1997 | Angell |
| 5,652,228 A | 7/1997 | Bissett |
| 5,656,584 A | 8/1997 | Angell |
| 5,674,478 A | 10/1997 | Dodd |
| 5,681,852 A | 10/1997 | Bissett |
| 5,691,297 A | 11/1997 | Nassano |
| 5,702,714 A | 12/1997 | Goss |
| 5,716,938 A | 2/1998 | Provitt |
| 5,723,420 A | 3/1998 | Wei |
| 5,725,869 A | 3/1998 | Lo |
| 5,750,122 A | 5/1998 | Evans |
| 5,756,436 A | 5/1998 | Royce |
| 5,759,573 A | 6/1998 | Kim |
| 5,782,409 A | 7/1998 | Paul |
| 5,783,536 A | 7/1998 | Farrell |
| 5,800,805 A | 9/1998 | Salas |
| 5,807,956 A | 9/1998 | Czech |
| 5,827,538 A | 10/1998 | Cussler |
| 5,833,971 A | 11/1998 | Baldwin |
| 5,856,409 A | 1/1999 | Ziemelis |
| 5,876,755 A | 3/1999 | Perring |
| 5,879,584 A | 3/1999 | Bianchetti |
| 5,885,701 A | 3/1999 | Berman |
| 5,929,022 A | 7/1999 | Velazquez |
| 5,945,085 A | 8/1999 | Salas |
| 5,962,018 A | 10/1999 | Curtis |
| 5,972,859 A | 10/1999 | Farrell |
| 5,981,681 A | 11/1999 | Czech |
| 6,024,943 A | 2/2000 | Ness |
| D424,745 S | 5/2000 | Tseng |

(56) References Cited

U.S. PATENT DOCUMENTS

| | | |
|---|---|---|
| 6,075,003 A | 6/2000 | Haq |
| 6,147,037 A | 11/2000 | Gardlik |
| 6,159,485 A | 12/2000 | Yu |
| 6,182,365 B1 | 2/2001 | Tseng |
| 6,185,822 B1 | 2/2001 | Tseng |
| 6,194,375 B1 | 2/2001 | Ness |
| 6,207,782 B1 | 3/2001 | Czech |
| 6,221,326 B1 | 4/2001 | Amiche |
| 6,221,826 B1 | 4/2001 | Surutzidis |
| 6,225,464 B1 | 5/2001 | Hiler, II |
| 6,228,398 B1 | 5/2001 | Devane |
| 6,235,274 B1 | 5/2001 | Lou |
| 6,235,773 B1 | 5/2001 | Bissett |
| 6,245,366 B1 | 6/2001 | Popplewell |
| 6,245,733 B1 | 6/2001 | Mosbaugh |
| 6,248,364 B1 | 6/2001 | Sengupta |
| 6,258,857 B1 | 7/2001 | Iijima |
| 6,261,483 B1 | 7/2001 | Frank |
| 6,294,514 B1 | 9/2001 | Welling |
| 6,298,558 B1 | 10/2001 | Tseng |
| 6,306,812 B1 | 10/2001 | Perkins |
| 6,325,995 B1 | 12/2001 | El-nokaly |
| 6,326,348 B1 | 12/2001 | Vinson |
| 6,329,057 B1 | 12/2001 | Dungworth |
| 6,348,218 B1 | 2/2002 | Hed |
| 6,355,263 B1 | 3/2002 | Shuku et al. |
| 6,362,159 B1 | 3/2002 | Aguadisch |
| 6,368,633 B1 | 4/2002 | Lou |
| 6,375,872 B1 | 4/2002 | Chao |
| 6,375,983 B1 | 4/2002 | Kantor |
| 6,376,445 B1 | 4/2002 | Bettiol |
| 6,399,192 B1 | 6/2002 | Pinna |
| 6,413,548 B1 | 7/2002 | Hamer |
| 6,428,796 B1 | 8/2002 | Gers-barlag |
| 6,451,754 B1 | 9/2002 | Rowland |
| 6,482,969 B1 | 11/2002 | Helmrick |
| 6,489,047 B2 | 12/2002 | Mosbaugh |
| 6,498,135 B1 | 12/2002 | Angell |
| 6,503,495 B1 | 1/2003 | Alwattari |
| 6,524,564 B1 | 2/2003 | Kim |
| 6,531,156 B1 | 3/2003 | Clark |
| 6,550,092 B1 | 4/2003 | Brown |
| 6,558,706 B2 | 5/2003 | Kantor |
| 6,592,990 B2 | 7/2003 | Schwantes |
| 6,594,904 B1 | 7/2003 | Tseng |
| 6,607,717 B1 | 8/2003 | Johnson |
| 6,608,017 B1 | 8/2003 | Dihora |
| 6,638,591 B2 | 10/2003 | Bowen |
| 6,670,311 B1 | 12/2003 | Aldcroft |
| 6,682,749 B1 | 1/2004 | Potechin |
| 6,696,049 B2 | 2/2004 | Vatter |
| 6,696,400 B2 | 2/2004 | Puelle |
| 6,703,032 B2 | 3/2004 | Gers-barlag |
| 6,730,325 B2 | 5/2004 | Devane |
| 6,733,790 B2 | 5/2004 | Garces |
| 6,767,880 B1 | 7/2004 | Foley |
| 6,769,271 B2 | 8/2004 | Mosbaugh |
| 6,770,293 B2 | 8/2004 | Angel |
| 6,780,507 B2 | 8/2004 | Toreki |
| 6,783,770 B2 | 8/2004 | Angel |
| 6,790,814 B1 | 9/2004 | Marin |
| 6,793,936 B2 | 9/2004 | Devane |
| 6,797,683 B2 | 9/2004 | Shana |
| 6,800,598 B1 | 10/2004 | Waeschenbach |
| 6,806,249 B2 | 10/2004 | Yang |
| 6,838,087 B1 | 1/2005 | Day |
| 6,846,785 B2 | 1/2005 | Patel |
| 6,849,584 B2 | 2/2005 | Geary |
| 6,849,591 B1 | 2/2005 | Boeckh |
| 6,864,223 B2 | 3/2005 | Smith |
| 6,869,923 B1 | 3/2005 | Cunningham |
| 6,872,696 B2 | 3/2005 | Becker et al. |
| 6,872,853 B1 | 3/2005 | Van Der Schaaf et al. |
| 6,881,482 B2 | 4/2005 | Vasisht |
| 6,902,742 B2 | 6/2005 | Devane |
| 6,916,481 B1 | 7/2005 | Prud |
| 6,939,992 B2 | 9/2005 | Van Der Schaaf et al. |
| 6,944,952 B1 | 9/2005 | Tseng |
| 6,949,498 B2 | 9/2005 | Murphy et al. |
| 6,951,836 B2 | 10/2005 | Jahns |
| 6,955,823 B2 | 10/2005 | Casson |
| 6,958,313 B2 | 10/2005 | Caswell |
| 6,982,256 B2 | 1/2006 | Votteler |
| 7,015,186 B2 | 3/2006 | Aussant |
| 7,041,767 B2 | 5/2006 | Lange |
| 7,053,034 B2 | 5/2006 | Shefer |
| 7,069,658 B2 | 7/2006 | Tseng |
| 7,105,064 B2 | 9/2006 | Popplewell |
| 7,119,057 B2 | 10/2006 | Popplewell |
| 7,122,512 B2 | 10/2006 | Brain |
| 7,125,835 B2 | 10/2006 | Bennett |
| 7,137,570 B2 | 11/2006 | Wheatley |
| 7,159,792 B2 | 1/2007 | Wheatley |
| 7,169,741 B2 | 1/2007 | Barry et al. |
| 7,186,679 B2 | 3/2007 | Shepherd, Jr. |
| 7,186,680 B2 | 3/2007 | Caswell |
| 7,192,599 B2 | 3/2007 | Mercier |
| 7,196,049 B2 | 3/2007 | Brain |
| 7,204,998 B2 | 4/2007 | Holzner |
| 7,208,463 B2 | 4/2007 | Heltovics |
| 7,208,465 B2 | 4/2007 | Heltovics |
| 7,211,273 B2 | 5/2007 | Hsu |
| 7,211,556 B2 | 5/2007 | Heibel |
| 7,217,777 B2 | 5/2007 | Lange |
| 7,226,607 B2 | 6/2007 | Uchiyama |
| 7,229,611 B2 | 6/2007 | Zamudio-tena |
| 7,235,261 B2 | 6/2007 | Smith |
| 7,241,835 B2 | 7/2007 | Obrien |
| 7,247,374 B2 | 7/2007 | Haggquist |
| 7,270,828 B2 | 9/2007 | Masuda |
| 7,279,542 B2 | 10/2007 | Ouali |
| 7,293,719 B2 | 11/2007 | Wheatley |
| 7,294,612 B2 | 11/2007 | Popplewell |
| 7,311,900 B2 | 12/2007 | Conover |
| 7,338,928 B2 | 3/2008 | Lau |
| 7,375,875 B2 | 5/2008 | Whitesides |
| 7,381,417 B2 | 6/2008 | Gamez-garcia |
| 7,399,324 B2 | 7/2008 | Roddenbery |
| 7,407,650 B2 | 8/2008 | Heltovics |
| 7,413,731 B2 | 8/2008 | Heltovics |
| 7,442,838 B2 | 10/2008 | Van Der Schaaf et al. |
| 7,452,547 B2 | 11/2008 | Lambino |
| 7,465,439 B2 | 12/2008 | Avery |
| 7,491,687 B2 | 2/2009 | Popplewell |
| 7,521,124 B2 | 4/2009 | Ahn |
| 7,524,807 B2 | 4/2009 | Clapp |
| 7,532,388 B2 | 5/2009 | Whitesides |
| 7,538,077 B2 | 5/2009 | Sichmann |
| 7,538,078 B2 | 5/2009 | Holzner |
| 7,569,528 B2 | 8/2009 | Lant |
| 7,575,633 B2 | 8/2009 | Romanin |
| 7,575,804 B2 | 8/2009 | Lang-Wittkowski |
| 7,585,824 B2 | 9/2009 | Popplewell |
| 7,585,825 B2 | 9/2009 | Artiga |
| 7,585,832 B2 | 9/2009 | Smith |
| 7,736,695 B2 | 6/2010 | Schwantes |
| 7,772,175 B2 | 8/2010 | Panandiker |
| 7,794,836 B2 | 9/2010 | Vasishtha |
| 7,799,421 B2 | 9/2010 | Goodson |
| 7,799,752 B2 | 9/2010 | Ness |
| 7,803,422 B2 | 9/2010 | Schwantes |
| 7,833,960 B2 | 11/2010 | Lei |
| 7,871,588 B2 | 1/2011 | Lindner |
| 7,932,191 B2 | 4/2011 | Dungworth et al. |
| 7,968,510 B2 | 6/2011 | Smets et al. |
| 7,985,445 B2 | 7/2011 | Schwantes |
| 7,998,494 B2 | 8/2011 | Holzner |
| 8,022,029 B2 | 9/2011 | Broze |
| 8,026,205 B2 | 9/2011 | Broze |
| 8,053,405 B2 | 11/2011 | Narayanan |
| 8,067,089 B2 | 11/2011 | Schwantes |
| 8,071,214 B2 | 12/2011 | Schwantes |
| 8,093,201 B2 | 1/2012 | Broze |
| 8,110,284 B2 | 2/2012 | Naigertsik |

(56) References Cited

U.S. PATENT DOCUMENTS

| | | |
|---|---|---|
| 8,119,163 B2 | 2/2012 | Devane |
| 8,129,327 B2 | 3/2012 | Zhang |
| 8,147,808 B2 | 4/2012 | Scavone |
| 8,158,571 B2 | 4/2012 | Alonso |
| 8,163,207 B2 | 4/2012 | Jung |
| 8,192,838 B2 | 6/2012 | Goodson |
| 8,206,820 B2 | 6/2012 | Bogaerts |
| 8,242,069 B2 | 8/2012 | Struillou |
| 8,246,869 B2 | 8/2012 | Stowell |
| 8,252,356 B2 | 8/2012 | Ogura |
| 8,304,075 B2 | 11/2012 | Lang-wittkowski |
| 8,329,154 B2 | 12/2012 | Uchiyama |
| 8,349,300 B2 | 1/2013 | Wells |
| 8,354,369 B2 | 1/2013 | Beaussoubre |
| 8,426,194 B2 | 4/2013 | Cao |
| 8,455,098 B2 | 6/2013 | Schwantes |
| 8,460,791 B2 | 6/2013 | Hentze |
| 8,460,864 B2 | 6/2013 | Cao |
| 8,470,762 B2 | 6/2013 | Broze |
| 8,551,935 B2 | 10/2013 | Smets |
| 8,784,984 B2 | 7/2014 | Grey |
| 8,853,142 B2 | 10/2014 | Corominas et al. |
| RE45,538 E | 6/2015 | Smets |
| 9,162,085 B2 | 10/2015 | Dihora et al. |
| 9,186,642 B2 | 11/2015 | Dihora |
| 9,221,028 B2 | 12/2015 | Dihora |
| 9,415,530 B2 | 8/2016 | Fukuda |
| 9,579,676 B1 | 2/2017 | Burrowes |
| 9,885,009 B2 | 2/2018 | Brundel et al. |
| 9,890,351 B2 | 2/2018 | Smets |
| 9,895,297 B2 | 2/2018 | Ribaut |
| 9,993,793 B2 | 6/2018 | Dihora |
| 10,059,907 B2 | 8/2018 | Ribaut |
| 10,308,894 B2 | 6/2019 | Feng |
| 10,385,297 B2 | 8/2019 | Song et al. |
| 10,920,177 B2 | 2/2021 | Smets et al. |
| 2002/0010123 A1 | 1/2002 | Schmiedel et al. |
| 2002/0016269 A1 | 2/2002 | Noda |
| 2002/0102286 A1 | 8/2002 | Kantor |
| 2002/0136773 A1 | 9/2002 | Scher |
| 2002/0169233 A1 | 11/2002 | Schwantes |
| 2003/0017126 A1 | 1/2003 | Mahadeshwar |
| 2003/0017959 A1 | 1/2003 | Baeck |
| 2003/0024997 A1 | 2/2003 | Welch |
| 2003/0031722 A1 | 2/2003 | Cao |
| 2003/0073607 A1 | 4/2003 | Smets |
| 2003/0077378 A1 | 4/2003 | Lou |
| 2003/0108501 A1 | 6/2003 | Hofrichter |
| 2003/0109391 A1 | 6/2003 | Midha |
| 2003/0125222 A1 | 7/2003 | Jahns |
| 2003/0139312 A1 | 7/2003 | Caswell |
| 2003/0152542 A1 | 8/2003 | Decoster |
| 2003/0170304 A1 | 9/2003 | Devane |
| 2003/0194416 A1 | 10/2003 | Shefer |
| 2003/0199412 A1 | 10/2003 | Gupta |
| 2003/0203978 A1 | 10/2003 | Obrien |
| 2003/0215417 A1 | 11/2003 | Uchiyama |
| 2003/0216488 A1 | 11/2003 | Uchiyama |
| 2003/0220220 A1 | 11/2003 | Bach |
| 2004/0013737 A1 | 1/2004 | Becourt |
| 2004/0043078 A1 | 3/2004 | Herault |
| 2004/0071742 A1 | 4/2004 | Popplewell |
| 2004/0087470 A1 | 5/2004 | Grandmaire |
| 2004/0091445 A1 | 5/2004 | Dykstra |
| 2004/0092425 A1 | 5/2004 | Boutique et al. |
| 2004/0101577 A1 | 5/2004 | Ahn |
| 2004/0109920 A1 | 6/2004 | Reuscher |
| 2004/0110898 A1 | 6/2004 | Dreja |
| 2004/0137028 A1 | 7/2004 | Poterie |
| 2004/0138088 A1 | 7/2004 | Pereira |
| 2004/0175347 A1 | 9/2004 | Bissett |
| 2004/0175404 A1 | 9/2004 | Shefer |
| 2004/0197405 A1 | 10/2004 | Devane |
| 2004/0208902 A1 | 10/2004 | Gupta |
| 2004/0214742 A1 | 10/2004 | Meli |
| 2004/0220062 A1 | 11/2004 | Pereira |
| 2004/0229769 A1 | 11/2004 | Smith |
| 2004/0251569 A1 | 12/2004 | Matsubara |
| 2004/0267182 A1 | 12/2004 | Davis et al. |
| 2005/0014674 A1 | 1/2005 | Liechty |
| 2005/0026801 A1 | 2/2005 | Broeckx et al. |
| 2005/0038188 A1 | 2/2005 | Ahn |
| 2005/0043209 A1 | 2/2005 | Schmiedel |
| 2005/0048549 A1 | 3/2005 | Cao |
| 2005/0089540 A1 | 4/2005 | Uchiyama |
| 2005/0112152 A1 | 5/2005 | Popplewell |
| 2005/0113282 A1 | 5/2005 | Parekh |
| 2005/0119351 A1 | 6/2005 | Van Der Schaaf et al. |
| 2005/0129759 A1 | 6/2005 | Sojka |
| 2005/0169793 A1 | 8/2005 | Wheatley |
| 2005/0215457 A1 | 9/2005 | Becks et al. |
| 2005/0226900 A1 | 10/2005 | Winton |
| 2005/0227907 A1 | 10/2005 | Lee |
| 2005/0276831 A1 | 12/2005 | Dihora |
| 2006/0008646 A1 | 1/2006 | Haggquist |
| 2006/0099168 A1 | 5/2006 | Corzani |
| 2006/0116304 A1 | 6/2006 | Mcritchie |
| 2006/0127430 A1 | 6/2006 | Gupta |
| 2006/0134154 A1 | 6/2006 | Giles |
| 2006/0160711 A1 | 7/2006 | Frank |
| 2006/0165740 A1 | 7/2006 | Frank |
| 2006/0166855 A1 | 7/2006 | Murad |
| 2006/0217288 A1 | 9/2006 | Wahl |
| 2006/0240105 A1 | 10/2006 | Devane |
| 2006/0248665 A1 | 11/2006 | Pluyter |
| 2006/0258557 A1 | 11/2006 | Popplewell |
| 2006/0263311 A1 | 11/2006 | Scavone |
| 2006/0263312 A1 | 11/2006 | Scavone |
| 2006/0263313 A1 | 11/2006 | Scavone |
| 2006/0263518 A1 | 11/2006 | Schwantes |
| 2006/0263519 A1 | 11/2006 | Schwantes |
| 2006/0263898 A1 | 11/2006 | Paget |
| 2006/0275237 A1 | 12/2006 | Bissett |
| 2006/0292098 A1 | 12/2006 | Scavone |
| 2007/0020205 A1 | 1/2007 | Blin |
| 2007/0031463 A1 | 2/2007 | Fotinos |
| 2007/0041929 A1 | 2/2007 | Torgerson |
| 2007/0048339 A1 | 3/2007 | Popplewell |
| 2007/0071781 A1 | 3/2007 | Louys |
| 2007/0071978 A1 | 3/2007 | Sojka |
| 2007/0078071 A1 | 4/2007 | Lee |
| 2007/0122481 A1 | 5/2007 | Liversidge |
| 2007/0123442 A1 | 5/2007 | Holzner |
| 2007/0134411 A1 | 6/2007 | Cont |
| 2007/0136328 A1 | 6/2007 | Carro |
| 2007/0138671 A1 | 6/2007 | Anastasiou |
| 2007/0138672 A1 | 6/2007 | Lee |
| 2007/0138673 A1 | 6/2007 | Lee |
| 2007/0138674 A1 | 6/2007 | Anastasiou |
| 2007/0160561 A1 | 7/2007 | Ouali |
| 2007/0160675 A1 | 7/2007 | Devane |
| 2007/0173433 A1 | 7/2007 | Heibel |
| 2007/0202063 A1 | 8/2007 | Dihora |
| 2007/0207109 A1 | 9/2007 | Peffly |
| 2007/0207174 A1 | 9/2007 | Pluyter |
| 2007/0224274 A1 | 9/2007 | Siol |
| 2007/0224395 A1 | 9/2007 | Rowitsch et al. |
| 2007/0248553 A1 | 10/2007 | Scavone |
| 2007/0286837 A1 | 12/2007 | Torgerson |
| 2007/0286904 A1 | 12/2007 | Popplewell |
| 2007/0292361 A1 | 12/2007 | Virgallito |
| 2007/0298061 A1 | 12/2007 | Boghani |
| 2008/0008750 A1 | 1/2008 | Tochio |
| 2008/0031961 A1 | 2/2008 | Cunningham et al. |
| 2008/0032909 A1 | 2/2008 | de Buzzaccarini et al. |
| 2008/0040082 A1 | 2/2008 | Stanton |
| 2008/0057021 A1 | 3/2008 | Dykstra |
| 2008/0061459 A1 | 3/2008 | Nakajima |
| 2008/0102121 A1 | 5/2008 | Devane |
| 2008/0107615 A1 | 5/2008 | Keene |
| 2008/0113025 A1 | 5/2008 | Devane |
| 2008/0118556 A1 | 5/2008 | Devane |
| 2008/0128941 A1 | 6/2008 | Lopez |
| 2008/0182774 A1 | 7/2008 | Naraschkewitz |

(56) References Cited

U.S. PATENT DOCUMENTS

| | | |
|---|---|---|
| 2008/0187596 A1 | 8/2008 | Dihora |
| 2008/0199503 A1 | 8/2008 | Camargo |
| 2008/0200359 A1 | 8/2008 | Smets |
| 2008/0200363 A1 | 8/2008 | Smets |
| 2008/0213451 A1 | 9/2008 | Ogura |
| 2008/0226684 A1 | 9/2008 | Peppas |
| 2008/0234406 A1 | 9/2008 | Rawlins |
| 2008/0305982 A1 | 12/2008 | Smets |
| 2008/0311064 A1 | 12/2008 | Lei |
| 2008/0317788 A1 | 12/2008 | Louzan |
| 2008/0318788 A1 | 12/2008 | Nadian |
| 2009/0010864 A1 | 1/2009 | Banowski et al. |
| 2009/0022764 A1 | 1/2009 | Frater |
| 2009/0023189 A1 | 1/2009 | Lau |
| 2009/0029900 A1 | 1/2009 | Cetti |
| 2009/0035365 A1 | 2/2009 | Popplewell |
| 2009/0047434 A1 | 2/2009 | Trophardy |
| 2009/0053165 A1 | 2/2009 | Brown |
| 2009/0081265 A1 | 3/2009 | Peppas |
| 2009/0118399 A1 | 5/2009 | Benbakoura |
| 2009/0120526 A1 | 5/2009 | Berktold |
| 2009/0142444 A1 | 6/2009 | Jarrard, Jr. |
| 2009/0149479 A1 | 6/2009 | Jenkins |
| 2009/0202465 A1 | 8/2009 | Mougin |
| 2009/0209661 A1 | 8/2009 | Somerville |
| 2009/0221463 A1 | 9/2009 | Kitko |
| 2009/0226529 A1 | 9/2009 | Quellet et al. |
| 2009/0232857 A1 | 9/2009 | Peppas |
| 2009/0232858 A1 | 9/2009 | Peppas |
| 2009/0247449 A1 | 10/2009 | Burdis |
| 2009/0252789 A1 | 10/2009 | Trophardy |
| 2009/0258042 A1 | 10/2009 | Anastasiou |
| 2009/0258812 A1 | 10/2009 | Sengupta |
| 2009/0274905 A1 | 11/2009 | Schwantes |
| 2009/0274906 A1 | 11/2009 | Schwantes |
| 2009/0274907 A1 | 11/2009 | Schwantes |
| 2009/0275494 A1 | 11/2009 | Ferguson |
| 2009/0289216 A1 | 11/2009 | Jung |
| 2009/0324660 A1 | 12/2009 | Cetti |
| 2010/0003518 A1 | 1/2010 | Grey |
| 2010/0029537 A1 | 2/2010 | Dihora et al. |
| 2010/0040884 A1 | 2/2010 | Smets |
| 2010/0056414 A1 | 3/2010 | Smith |
| 2010/0061954 A1 | 3/2010 | Adams |
| 2010/0068163 A1 | 3/2010 | Lu |
| 2010/0068525 A1 | 3/2010 | Willax |
| 2010/0104611 A1 | 4/2010 | Chan |
| 2010/0104612 A1 | 4/2010 | Cropper |
| 2010/0104613 A1 | 4/2010 | Chan |
| 2010/0119679 A1 | 5/2010 | Dihora |
| 2010/0179088 A1 | 7/2010 | Flachsmann et al. |
| 2010/0190674 A1 | 7/2010 | Smets et al. |
| 2010/0216684 A1 | 8/2010 | Ferguson |
| 2010/0275384 A1 | 11/2010 | Broze |
| 2010/0286018 A1 | 11/2010 | Hentze |
| 2010/0297446 A1 | 11/2010 | Oxley |
| 2011/0003152 A1 | 1/2011 | Grey |
| 2011/0005001 A1 | 1/2011 | Robles |
| 2011/0008427 A1 | 1/2011 | Biggs |
| 2011/0008435 A1 | 1/2011 | Devane |
| 2011/0020416 A1 | 1/2011 | Pluyter |
| 2011/0021408 A1 | 1/2011 | Meek et al. |
| 2011/0033513 A1 | 2/2011 | Lei |
| 2011/0086788 A1 | 4/2011 | Smets |
| 2011/0093246 A1 | 4/2011 | Stanton |
| 2011/0104221 A1 | 5/2011 | Galeone et al. |
| 2011/0110997 A1 | 5/2011 | Cunningham et al. |
| 2011/0111999 A1 | 5/2011 | Smets |
| 2011/0152147 A1 | 6/2011 | Smets |
| 2011/0239377 A1 | 10/2011 | Fossum et al. |
| 2011/0239378 A1 | 10/2011 | Fossum et al. |
| 2011/0245139 A1 | 10/2011 | Koehle et al. |
| 2011/0245140 A1 | 10/2011 | Demeyere |
| 2011/0245141 A1 | 10/2011 | Gizaw |
| 2011/0267702 A1 | 11/2011 | Fujimoto |
| 2011/0268778 A1 | 11/2011 | Dihora |
| 2011/0268802 A1 | 11/2011 | Dihora |
| 2011/0269657 A1 | 11/2011 | Dihora |
| 2011/0269658 A1 | 11/2011 | Dihora |
| 2011/0294715 A1 | 12/2011 | Smets |
| 2011/0306116 A1 | 12/2011 | Jin |
| 2012/0010120 A1 | 1/2012 | Somerville |
| 2012/0053108 A1 | 3/2012 | Glenn, Jr. |
| 2012/0071391 A1 | 3/2012 | Smets |
| 2012/0076839 A1 | 3/2012 | Chan |
| 2012/0114582 A1 | 5/2012 | Batchelor |
| 2012/0121677 A1 | 5/2012 | Franklin |
| 2012/0152268 A1 | 6/2012 | York |
| 2012/0177924 A1 | 7/2012 | Jung |
| 2012/0258150 A1 | 10/2012 | Rauckhorst |
| 2012/0276175 A1 | 11/2012 | Dihora |
| 2012/0276210 A1 | 11/2012 | Dihora |
| 2012/0282309 A1 | 11/2012 | Dihora |
| 2012/0322709 A1 | 12/2012 | Li |
| 2013/0039962 A1 | 2/2013 | Smets |
| 2013/0137625 A1 | 5/2013 | Stowell |
| 2013/0203644 A1 | 8/2013 | Lant |
| 2013/0245153 A1 | 9/2013 | Schwantes |
| 2013/0296211 A1 | 11/2013 | Smets |
| 2013/0302392 A1 | 11/2013 | Mistry |
| 2014/0037703 A1 | 2/2014 | Dihora |
| 2014/0079747 A1* | 3/2014 | Dihora .................. A61K 8/11 510/276 |
| 2014/0079748 A1 | 3/2014 | Cetti |
| 2014/0086965 A1 | 3/2014 | Dihora |
| 2014/0127309 A1 | 5/2014 | Drake |
| 2014/0178442 A1 | 6/2014 | Li |
| 2014/0227328 A1 | 8/2014 | Dihora |
| 2014/0338134 A1 | 11/2014 | Fernandez Prieto et al. |
| 2014/0342964 A1 | 11/2014 | Jackson et al. |
| 2014/0342972 A1 | 11/2014 | Smets |
| 2015/0000048 A1 | 1/2015 | Miracle |
| 2015/0017214 A1 | 1/2015 | Warr |
| 2015/0071977 A1 | 3/2015 | Dihora et al. |
| 2015/0086595 A1 | 3/2015 | Dihora |
| 2015/0132377 A1 | 5/2015 | Reymar |
| 2015/0284660 A1 | 10/2015 | Budijono et al. |
| 2015/0352576 A1 | 12/2015 | Burrowes et al. |
| 2015/0353867 A1* | 12/2015 | Dring .................. A61Q 13/00 512/4 |
| 2016/0024434 A1 | 1/2016 | Sivik |
| 2016/0108340 A1 | 4/2016 | Feng et al. |
| 2016/0128917 A1 | 5/2016 | Wei |
| 2016/0168509 A1 | 6/2016 | Hitchcock et al. |
| 2016/0184196 A1 | 6/2016 | Baxter |
| 2016/0304817 A1 | 10/2016 | Fernandez Prieto et al. |
| 2017/0002293 A1 | 1/2017 | Dihora |
| 2017/0002301 A1 | 1/2017 | Dihora |
| 2017/0002302 A1 | 1/2017 | Dihora |
| 2018/0110700 A1 | 4/2018 | Dihora et al. |
| 2018/0215982 A1 | 8/2018 | Zhang et al. |
| 2018/0264425 A1 | 9/2018 | Verstraete et al. |
| 2018/0265811 A1 | 9/2018 | Fernandez Prieto |
| 2018/0265818 A1 | 9/2018 | Smets |
| 2018/0265827 A1 | 9/2018 | Oh |
| 2018/0289597 A1 | 10/2018 | Baxter |
| 2018/0333341 A1 | 11/2018 | Nijakowski et al. |
| 2018/0360706 A1 | 12/2018 | Dihora |
| 2018/0362892 A1 | 12/2018 | Beckholt |
| 2019/0062676 A1 | 2/2019 | Ott |
| 2019/0091115 A1 | 3/2019 | Nijakowski et al. |
| 2019/0142714 A1 | 5/2019 | Dihora |
| 2020/0002653 A1 | 1/2020 | Smets |
| 2020/0002654 A1 | 1/2020 | Smets |
| 2020/0181543 A1 | 6/2020 | Smets |
| 2020/0222873 A1 | 7/2020 | Neuman et al. |
| 2020/0283704 A1* | 9/2020 | Smets .................. C11D 3/505 |
| 2020/0283705 A1 | 9/2020 | Smets |
| 2020/0330937 A1 | 10/2020 | Rodrigo-gomez et al. |
| 2020/0330951 A1 | 10/2020 | Rodrigo-gomez et al. |
| 2020/0330952 A1* | 10/2020 | Rodrigo-Gomez .................. C11D 17/0039 |
| 2020/0407665 A1 | 12/2020 | Joos |
| 2021/0252469 A1 | 8/2021 | Feng |

(56) References Cited

U.S. PATENT DOCUMENTS

| | | | |
|---|---|---|---|
| 2021/0339217 A1 | 11/2021 | Feng | |
| 2022/0119741 A1* | 4/2022 | Smets | C11D 17/0039 |
| 2022/0119742 A1* | 4/2022 | Smets | C11D 17/0039 |
| 2022/0151902 A1 | 5/2022 | Denigot | |
| 2022/0396750 A1* | 12/2022 | Smets | A01N 25/28 |
| 2023/0159863 A1 | 5/2023 | Charkar et al. | |
| 2024/0206461 A1* | 6/2024 | Smets | A61K 8/35 |

FOREIGN PATENT DOCUMENTS

| | | |
|---|---|---|
| DE | 10062585 A1 | 6/2002 |
| DE | 102006058253 A1 | 6/2008 |
| DE | 10200803501 A1 | 1/2010 |
| DE | 102008044700 A1 | 2/2010 |
| EP | 0523287 A1 | 1/1993 |
| EP | 0820762 A1 | 1/1998 |
| EP | 0829259 A1 | 3/1998 |
| EP | 1034705 A2 | 9/2000 |
| EP | 1243318 A1 | 9/2002 |
| EP | 1243320 A1 | 9/2002 |
| EP | 1247568 A1 | 10/2002 |
| EP | 1600151 A1 | 11/2005 |
| EP | 1702674 A1 | 9/2006 |
| EP | 1850887 B1 | 7/2008 |
| EP | 2132294 B1 | 9/2012 |
| EP | 2090284 B1 | 12/2012 |
| EP | 2620211 A2 | 7/2013 |
| EP | 2938429 A1 | 11/2015 |
| EP | 3375858 A1 | 9/2018 |
| EP | 2433617 B1 | 5/2019 |
| FR | 2702961 A1 | 9/1994 |
| FR | 2881048 A1 | 7/2006 |
| GB | 1451411 A | 10/1976 |
| GB | 1478788 A | 7/1977 |
| GB | 1546480 A | 5/1979 |
| GB | 2062570 A | 5/1981 |
| GB | 2217603 A | 11/1989 |
| GB | 2274989 B | 3/1997 |
| GB | 2334724 A | 9/1999 |
| JP | S545051 A | 1/1979 |
| JP | S5819261 A | 2/1983 |
| JP | 59139268 A | 8/1984 |
| JP | 61244366 A | 10/1986 |
| JP | 62116506 A | 5/1987 |
| JP | 01256965 A | 10/1989 |
| JP | 02052661 A | 2/1990 |
| JP | H0236803 A | 2/1990 |
| JP | 04021513 A | 1/1992 |
| JP | 04082558 A | 3/1992 |
| JP | 04156851 A | 5/1992 |
| JP | 05017338 A | 1/1993 |
| JP | 06000361 A | 1/1994 |
| JP | H0641576 U | 6/1994 |
| JP | 07075666 A | 3/1995 |
| JP | 07305049 A | 11/1995 |
| JP | H07303829 A | 11/1995 |
| JP | H10195478 A | 7/1998 |
| JP | 10231119 A | 9/1998 |
| JP | 2000079337 A | 3/2000 |
| JP | 2000218154 A | 8/2000 |
| JP | 2001049287 A | 2/2001 |
| JP | 2002326904 A | 11/2002 |
| JP | 2003099986 A | 4/2003 |
| JP | 2003161893 A | 6/2003 |
| JP | 2004083475 A | 3/2004 |
| JP | 2004099743 A | 4/2004 |
| JP | 2005194308 A | 7/2005 |
| JP | 2007016161 A | 1/2007 |
| JP | 2008156565 A | 7/2008 |
| JP | 2009035454 A | 2/2009 |
| JP | 2009280533 A | 12/2009 |
| JP | 2009290236 A | 12/2009 |
| JP | 2017080651 A | 5/2017 |
| JP | 2018522975 A | 8/2018 |
| KR | 20090082704 A | 7/2009 |
| KR | 20150100309 A | 9/2015 |
| WO | 8403630 A1 | 9/1984 |
| WO | 9308600 A1 | 4/1993 |
| WO | 93/22417 A1 | 11/1993 |
| WO | 9747720 A2 | 12/1997 |
| WO | 9812298 A2 | 3/1998 |
| WO | 9826808 A2 | 6/1998 |
| WO | 9844084 A1 | 10/1998 |
| WO | 9917736 A1 | 4/1999 |
| WO | 9921532 A1 | 5/1999 |
| WO | 9924159 A1 | 5/1999 |
| WO | 9948479 A1 | 9/1999 |
| WO | 0032601 A2 | 6/2000 |
| WO | 0041528 A2 | 7/2000 |
| WO | 0065019 A1 | 11/2000 |
| WO | 0067718 A1 | 11/2000 |
| WO | 200065020 A1 | 11/2000 |
| WO | 0141915 A1 | 6/2001 |
| WO | 0162376 A1 | 8/2001 |
| WO | 0174310 A2 | 10/2001 |
| WO | 03002248 A1 | 1/2003 |
| WO | 03020867 A1 | 3/2003 |
| WO | 2004006967 A1 | 1/2004 |
| WO | 2004060418 A1 | 7/2004 |
| WO | 2004096895 A2 | 11/2004 |
| WO | 2005047232 A1 | 5/2005 |
| WO | 2005055990 A1 | 6/2005 |
| WO | 2006027664 A2 | 3/2006 |
| WO | 2007040517 A1 | 4/2007 |
| WO | 2007128326 A1 | 11/2007 |
| WO | 2007137441 A1 | 12/2007 |
| WO | 2008005693 A2 | 1/2008 |
| WO | 2008016637 A1 | 2/2008 |
| WO | 2008129028 A1 | 10/2008 |
| WO | 2008145874 A1 | 12/2008 |
| WO | 2008104352 A3 | 1/2009 |
| WO | 2009047127 A1 | 4/2009 |
| WO | 2009080695 A1 | 7/2009 |
| WO | 2009095823 A1 | 8/2009 |
| WO | 2009093812 A3 | 10/2009 |
| WO | 2009150017 A1 | 12/2009 |
| WO | 2010009976 A2 | 1/2010 |
| WO | 2010079458 A3 | 1/2011 |
| WO | 2011054389 A1 | 5/2011 |
| WO | 2011056935 A1 | 5/2011 |
| WO | 2012022034 A1 | 2/2012 |
| WO | 2012022736 A1 | 2/2012 |
| WO | 2013026657 A1 | 2/2013 |
| WO | 2014029695 A1 | 2/2014 |
| WO | 2014104369 A1 | 3/2014 |
| WO | 2014189906 A2 | 11/2014 |
| WO | 2015041791 A1 | 3/2015 |
| WO | 2015070228 A1 | 5/2015 |
| WO | 2015191517 A1 | 12/2015 |
| WO | 2016014733 A1 | 1/2016 |
| WO | 2017004339 A1 | 1/2017 |
| WO | 2017058875 A1 | 4/2017 |
| WO | 2020118020 A1 | 6/2020 |
| WO | 2020214875 A1 | 10/2020 |
| WO | 2020214891 A1 | 10/2020 |

OTHER PUBLICATIONS

Cheng et al., "Preparation of monodisperse poly(N-isopropylacrylamide) microspheres and microcapsules via Shirasu-porous-glass membrane emulsification", Science Direct, Desalination 234, 2008, pp. 184-194.

Database WPI, week 201566, Thompson Scientific, London GB, AN 2015-53862D, XP002794945.

Database WPI, week 201566, Thompson Scientific, London GB, AN 2015-53862D, XP002799564.

Fernandes et al., "Influence of Spray Drying Operating Conditions on Microencapsulated Rosemary Essential Oil Properties", Ciência e Tecnologia de Alimentos, vol. 33, Suppl. 1, 2013, pp. 171-178.

Fowkes, F.M., "Attractive Forces at Interfaces", Industrial and Engineering Chemistry, vol. 56, No. 12, 1964, pp. 40-52.

(56) References Cited

OTHER PUBLICATIONS

Good, et al, A Theory for Estimation of Surface and Interfacial Energies, III, Estimation of Surface Energies or Solids from Contact Angle Data, The Journal of Physical Chemistry, vol. 64, May 1960, pp. 561-565.

Herbig, James A., "Microencapsulation", Kirk Othmer Encyclopedia of Chemical Technology, vol. 13, Second Edition, pp. 436-456, (date unknown).

Huber et al, "Capsular Adhesives", Tappi, vol. 49, No. 5, May 1966, pp. 41A-44A.

Jyothi et al, "Microencapsulation techniques, factors influencing encapsulation efficiency", Journal of Microencapsulation, 27:3, pp. 187-197, (date unknown).

Ichemco, Selvol 540, Mar. 14, 2013., 1 page.

Leo et al, "Methods of Calculating Partition Coefficients", Comprehensive Medicinal Chemistry, vol. 4, 1990, pp. 295-319.

Sekisui: Selvol Polyvinyl Alcohol—A Versatile High Performance Polymer; Mar. 30, 2015, pp. 1-9, XP055422301, retrieved from the Internet: URL: http://www.sekisui-sc.com/wp-content/uploads/SelvolPVOH_Brochure_EN.pdf [retrieved on Nov. 7, 2017] the whole document.

Takenaka et al., "Preparation of enteric-coated microcapsules for tableting by spray-drying technique and in Vitro simulation of drug release from the tablet in GI tract", Journal of Pharmaceutical Sciences, vol. 69, Issue 12, Dec. 1980, pp. 1388-1392.

Thompson et al., "Colloidosomes: Synthesis, properties and applications", Journal of Colloid and Interface Science, 447, 2015, pp. 217-228.

U.S. Appl. No. 17/500,974, filed Oct. 14, 2021, to Johan Smets et. al.

U.S. Appl. No. 17/500,975, filed Oct. 14, 2021, to Johan Smets et. al.

Uppalapati et el., "Effect of External Lubricant on Mechanical Properties of Dry-Pressed Green Bodies", Journal of the American Ceramic Society, 2005, vol. 88, No. 6, pp. 1397-1402.

Vladisavljevic et al., "Recent developments in manufacturing emulsions and particulate products using membranes", Advances in Colloid and Interface Science, vol. 113, No. 1, Mar. 17, 2005, pp. 1-20.

Washburn, Edward W., "The Dynamics of Capillary Flow", Physical Review Journals, vol. 17, No. 3, 1921, pp. 374-375.

Xie et al., "The Effects of Rheological Properties of Wall Materials on Morphology and Particle Size Distribution of Microcapsulein Czech", Journal of Food Science, 2010, vol. 28, No. 5, pp. 433-439.

Zhang, Z. et al, "Mechanical Properties of Melamine-FormaldehydeMicrocapsules", Journal of Microencapsulation, vol. 18, No. 5, 2001, pp. 593-602.

Zim's Crack Creme (R),2003, Perfects Products, Inc., Berlin Center, Ohio 44401, pp. 1-3.

All Office Actions; U.S. Appl. No. 19/016,002, filed Jan. 10, 2025.

U.S. Appl. No. 19/016,002, filed Jan. 10, 2025, to Johan Smets et. al.

\* cited by examiner

CONSUMER PRODUCTS COMPRISING DELIVERY PARTICLES WITH HIGH CORE:WALL RATIOS

FIELD OF THE INVENTION

The present disclosure relates to consumer products that include treatment adjuncts and delivery particles having certain sizes, certain monomers (for example, multifunctional (meth)acrylate monomers), and certain core:wall polymer weight ratios. The present disclosure also relates to methods related to the use and manufacture of such compositions, including methods of treating a surface, such as a fabric.

BACKGROUND OF THE INVENTION

Manufacturers of consumer products wish to make efficient use of benefit agents and ensure good performance in the end use of their products. Certain benefit agents, such as fragrance, can be encapsulated in a core/shell delivery particle. Such particles can deposit on a target surface and release the benefit agent upon certain triggers, such as by rupturing via friction or other pressure.

In order to increase the delivery efficiency, a number of measures may be taken, but each tends to have drawbacks. For example, the particle size may be increased, but large particles tend to leak more than small particles and may not rupture at desired times. The relative amount of benefit agent in the core can be increased relative to the wall, but this, too, tends to result in relatively leaky particles as the walls become relatively thinner. Further, brittle capsules may prematurely rupture during the manufacturing process, for example due to mixing shear applied to a product composition. Additional wall material may reduce leakage and/or improve capsule strength, but then the particles may not adequately rupture at desired touchpoints, and payload or delivery efficiency is lower. Further, given the many known wall materials in the art, there is little guidance regarding what materials will work best for a given application or particle type.

There is a need for consumer products that include delivery particles that provide efficient benefit agent delivery, including relatively low leakage profiles and desirable release profiles.

SUMMARY OF THE INVENTION

The present disclosure relates to consumer products that include treatment adjuncts and delivery particles having certain sizes, monomers, and core:wall ratios.

For example, the present disclosure relates to a consumer product composition that includes a treatment adjunct and a population of delivery particles, where the delivery particles include a core and a polymer wall surrounding the core, where the core includes a benefit agent and a partitioning modifier, where the partitioning modifier is present in the core at a level of from about 5% to about 55%, by weight of the core, where the polymer wall includes a (meth)acrylate polymer derived, at least in part, from one or more oil-soluble or oil-dispersible multifunctional (meth)acrylate monomers or oligomers that have at least three radical polymerizable functional groups, with the proviso that at least one of the radical polymerizable groups is acrylate or methacrylate; where the core and the polymer wall are present in a weight ratio of from about 96:4 to about 99.5:0.5; and where the delivery particles are characterized by a volume-weighted particle size from about 30 to about 50 microns.

The present disclosure also relates to a method of treating a surface, preferably a fabric, where the method includes the step of contacting the surface with a consumer product composition according to the present disclosure, optionally in the presence of water.

BRIEF DESCRIPTION OF THE DRAWINGS

The figures herein are illustrative in nature and are not intended to be limiting.

DETAILED DESCRIPTION OF THE INVENTION

Figure 1:
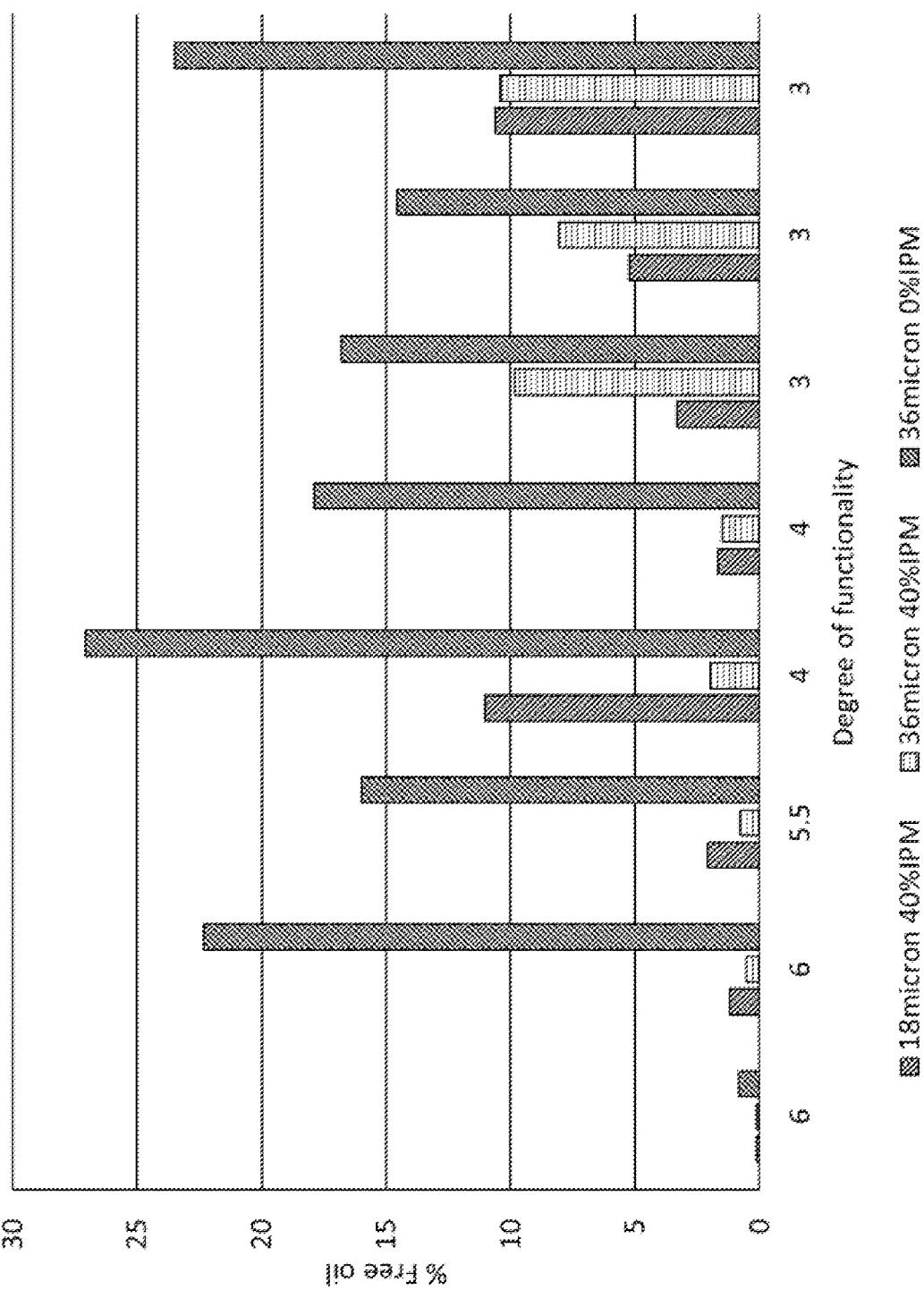
FIG. 1 is a graph depicting percent leakage of perfume delivery particles according to the present disclosure, prepared at 18 and 36 micron diameter, and compared to 36 micron microcapsules in the absence of isopropyl myristate using (meth)acrylate monomers of various functionality as indicated.

The present disclosure relates to consumer products that include populations of delivery particles. The delivery particles (or simply "particles", as used herein) are core/shell particles that include a benefit agent, and typically a partitioning modifier, in the core.

It has surprisingly been found that delivery particles having desirable leakage profiles and release profiles can be formed by careful selection of a combination of factors—for example, core-to-wall-polymer weight ratios, particle size, and monomers used to form the polymer wall. As a result of the combinations described herein, it is possible to formulate consumer products with delivery particles that have unexpectedly high pay loads, yet which still exhibit decreased benefit agent leakage, and provide a desired odor-release profile.

The particles, compositions, and related methods are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly(meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth)acrylate, and various multifunctional(meth)acrylates. Monofunctional (meth)acrylates, i.e., those containing only one (meth)acrylate group, may also be advantageously used. Typical mono(meth)acrylates include 2-ethylhexyl (meth)acrylate, 2-hydroxyethyl (meth)acrylate, cyanoethyl (meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

As used herein, "delivery particles," "particles," "encapsulates," "microcapsules," and "capsules" are used interchangeably, unless indicated otherwise.

For ease of reference in this specification and in the claims, the term "monomer" or "monomers" as used herein with regard to the wall polymer is to be understood as monomers but also is inclusive of oligomers or monomers, and prepolymers formed of the specific monomers.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Consumer Product Composition

The present disclosure relates to consumer product compositions (or simply "compositions" as used herein). The compositions of the present disclosure may comprise a population of delivery particles and a treatment adjunct, each described in more detail below.

The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions may be not intended for subsequent commercial manufacture or modification.

The consumer product composition may be a fabric care composition, a hard surface cleaner composition, a dish care composition, a hair care composition (such as shampoo or conditioner), a body cleansing composition, or a mixture thereof.

The consumer product composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof.

The composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The composition may be a home care composition, such as an air care, car care, dishwashing, hard surface cleaning and/or treatment, and other cleaning for consumer or institutional use.

The consumer product composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compaiiments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, from a bottle via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 s$^{-1}$ and 21° C.

Additional components and/or features of the compositions, such as delivery particles and consumer product adjunct materials, are discussed in more detail below.

Populations of Delivery Particles

The compositions and products of the present disclosure comprise populations of delivery particles.

The composition may comprise from about 0.05% to about 20%, or from about 0.05% to about 10%, or from about 0.1% to about 5%, or from about 0.2% to about 2%, by weight of the composition, of delivery particles. The composition may comprise a sufficient amount of delivery particles to provide from about 0.05% to about 10%, or from about 0.1% to about 5%, or from about 0.1% to about 2%, by weight of the composition, of perfume to the composition. When discussing herein the amount or weight percentage of the delivery particles, it is meant the sum of the shell material and the core material.

The delivery particles typically comprise a core and a shell, where the shell delivery particles the core. As described in more detail below, the core may include a benefit agent and optionally a partitioning modifier, and the shell may comprise certain polymers, namely an acrylate material.

The delivery particles may have a volume weighted median particle size of from about 30 to about 50 microns, preferably from about 30 to about 40 microns.

The population of delivery particles may have a relatively wide distribution of particle sizes. As mentioned above it is believed that a wide distribution contributes to the compositions being more effective on various types of fabrics or garments. The population of delivery particles may be characterized by a Broadness Index, which is a way of characterizing the size distribution.

The Broadness Index is calculated by determining the particle size at which 90% of the cumulative particle volume is exceeded (90% size), the particle size at which 5% of the cumulative particle volume is exceeded (5% size), and the median volume-weighted particle size (50% size; where 50% of the particle volume is both above and below this size). The values can be used in the following equation to determine the Broadness Index for a population of delivery particles.

$$\text{Broadness Index} = (90\% \text{ size} - 5\% \text{ size})/50\% \text{ size}$$

The population of delivery particles of the present disclosure may be characterized by a Broadness Index of at least 1.0, preferably at least 1.1, more preferably at least 1.2. The population of delivery particles may be characterized by a Broadness Index of from about 1.0 to about 2.0, or from about 1.0 to about 1.8, or from about 1.1 to about 1.6, or from about 1.1 to about 1.5, or from about 1.2 to about 1.5, or from about 1.2 to about 1.4. Relatively higher Broadness Index values indicate a relatively wider particle size distribution.

The population of delivery particles may be characterized by one or more of the following: (i) a 5$^{th}$-percentile volume-weighted particle size of from about 1 micron to about 15 microns; (ii) a 50$^{th}$-percentile (median) volume-weighted particle size of from about 30 microns to about 50 microns; (iii) a $90^{th}$-percentile volume-weighted particle size of from about 40 microns to about 80 microns; or (iv) a combination thereof.

The delivery particles may be characterized by a fracture strength. Fracture strength is determined according to the procedure provided in the Test Method section below. The population of delivery particles may be characterized by an average Fracture Strength (where fracture strength is measured across several capsules at the median/$d_{50}$ size of the population) of about 0.2 MPa to about 30 MPa, or about 0.4 MPa to about 10 MPa, or about 0.6 MPa to about 5 MPa, or even from about 0.8 MPa to about 4 MPa. The population of delivery particles may be characterized by an average Fracture Strength of about 0.2 MPa to about 10 MPa, or from about 0.5 MPa to about 8 MPa, or from about 0.5 MPa to about 6 MPa, or from about 0.5 MPa to about 5 MPa, or from about 0.7 MPa to about 4 MPa, or from about 1 MPa to about 3 MPa. The population of delivery particles may be characterized by an average Fracture Strength of from about 0.2 to about 10 MPa, preferably from about 0.5 to about 8 MPa, more preferably from about 0.5 to about 5 MPa. It is believed that delivery particles having an average Fracture Strength at $d_{50}$ at these levels will perform well at one or more touchpoints that are typical for a surface, such as a fabric, treated with a composition according to the present disclosure.

As described in more detail below, the delivery particles of the present disclosure comprise a core and a shell surrounding the core. It has surprisingly been found that selecting, among other things, particular ratios of core material to shell material can result in populations of delivery particles that show improved performance. Without wishing to be bound by theory, it is believed that formulating delivery particles having a relatively high ratio of core to wall provides populations that have the desirable fracture strength profiles described in the present disclosure. Additionally, delivery particles with a high core:wall ratio can deliver a benefit agent more efficiently, requiring less wall material to deliver the same amount of benefit agent. Further, because the delivery particles have relatively high loading of benefit agent, less delivery particle material may be required for a particular composition, saving cost and/or freeing up formulation space.

The delivery particles of the present disclosure may be characterized by a core-to-polymer-wall weight ratio (also "core:polymer wall ratio," "core-wall ratio," "core:wall ratio," or even "C:W ratio" and the like, as used herein). Relatively high core:wall ratios are typically preferred to increase the delivery efficiency or relatively payload of the particles. However, if the ratio is too high, then the capsule may become too brittle or leaky and provide suboptimal performance.

As used herein, the core:polymer wall ratio is be understood as calculated on the basis of the weight of the reacted wall-forming materials and initiators that constitute the polymer wall, and for purposes of the calculation excludes in the calculation entrapped nonstructural materials, such as entrapped emulsifier. The calculation is based the amounts of the starting inputs, namely the input monomers and initiators. A sample core:wall polymer ratio calculation is illustrated in Example 1 below. If the amounts of starting inputs are not readily available, then the core:wall ratio is determined according to the Analytical Determination of the Core:Wall Ratio procedure provided in the Test Methods section.

A delivery particle, preferably the population of delivery particles, may be characterized by a core:polymer wall weight ratio of at least about 96:4, more preferably at least about 97:3, even more preferably at least about 98:2, even more preferably at least about 99:1. A delivery particle, preferably the population of delivery particles, may be characterized by a core-to-polymer-wall weight ratio of from about 96:4 to about 99.5:0.5, preferably from about 96:4 to about 99:1, more preferably from about 97:3 to about 99:1, even more preferably from about 98:2 to about 99:1. The core-to-polymer-wall weight ratio may be from about 96:4 to about 99:1, or from about 96:4 to about 98:2, or from about 97:3 to about 98:2.

Components and processes related to the delivery particles of the present disclosure are described in more detail below.

a. Polymer Wall

The delivery particles of the present disclosure include a polymer wall that surrounds a core. To note, as used herein, the terms "polymer wall," "wall," and "shell" are used interchangeably, unless otherwise indicated.

The polymer wall comprises a polymeric material, specifically a (meth)acrylate polymer. The (meth)acrylate polymer is derived, at least in part, from one or more oil-soluble or oil-dispersible multifunctional (meth)acrylate monomers or oligomers.

The polymer wall may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the polymer wall, of the (meth)acrylate polymer. The polymer wall may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the polymer wall, of the oil-soluble or oil-dispersible multifunctional (meth)acrylate monomer or oligomer. The (meth)acrylate polymer may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the (meth)acrylate polymer, of the oil-soluble or oil-dispersible multifunctional (meth)acrylate monomer or oligomer.

The one or more oil-soluble or oil-dispersible multifunctional (meth)acrylate monomers or oligomers comprise at least three, preferably at least four, preferably at least five, preferably at least six, more preferably exactly six, radical polymerizable functional groups, with the proviso that at least one of the radical polymerizable functional groups is an acrylate or methacrylate group.

The one or more oil-soluble or oil-dispersible multifunctional (meth)acrylate monomers or oligomers may comprise from three to six, preferably from four to six, more preferably from five to six, most preferably six, radical polymerizable functional groups. It is believed that monomers comprising a relatively greater number of radical polymerizable groups result in, for example, delivery particles with more compact walls and having preferred properties, such as less leakage, compared to walls formed from monomers that have fewer radical polymerizable groups.

The radical polymerizable functional groups may be independently selected from the group consisting of acrylate, methacrylate, styrene, allyl, vinyl, glycidyl, ether, epoxy, carboxyl, or hydroxyl, with the proviso that at least one of the radical polymerizable groups is acrylate or methacrylate. Preferably, at least two, or at least three, or at least four, or at least five, or at least six of the radical polymerizable functional groups is an acrylate or methacrylate group. Preferably, the radical polymerizable functional groups are each independently selected from the group consisting of acrylate and methacrylate. It is believed that these functional groups result in delivery particles having preferred properties, such as less leakage at high core:wall ratios, compared to other functional groups.

The oil-soluble or oil-dispersible multifunctional (meth) acrylate monomers or oligomers may comprise a multifunctional aromatic urethane acrylate. Preferably, the oil-soluble or oil-dispersible multifunctional (meth)acrylate monomers or oligomers comprises a hexafunctional aromatic urethane acrylate.

Additionally or alternatively, the oil-soluble or oil-dispersible multifunctional (meth)acrylate monomers or oligomers may comprise a multifunctional aliphatic urethane acrylate.

The (meth)acrylate polymer of the polymer wall may be derived from at least two different multifunctional (meth) acrylate monomers, for example first and second multifunctional (meth)acrylate monomers, each of which may preferably be oil-soluble or oil-dispersible. The first multifunctional (meth)acrylate monomer may comprise a different number of radical polymerizable functional groups compared to the second multifunctional (meth)acrylate monomer. For example, the first multifunctional (meth) acrylate monomer may comprise six radical polymerizable functional groups (e.g., hexafunctional), and the second multifunctional (meth)acrylate monomer may comprise less than six radical polymerizable functional groups, such as a number selected from three (e.g., trifunctional), four (e.g., tetrafunctional), or five (e.g., pentafunctional), preferably five. The first and second multifunctional (meth)acrylate monomers may be comprise the same number of radical polymerizable functional groups, such as six (e.g., both monomers are hexafunctional), although the respective monomers are characterized by different structures or chemistries.

The oil-soluble or oil-dispersible (meth)acrylate may further comprise a monomer selected from an amine methacrylate, an acidic methacrylate, or a combination thereof.

The (meth)acrylate polymer of the polymer wall may be a reaction product derived from the oil-soluble or oil-dispersible multifunctional (meth)acrylate, a second monomer, and a third monomer. Preferably, the second monomer comprises a basic (meth)acrylate monomer, and the third monomer comprises an acidic (meth)acrylate monomer. The basic (meth)acrylate monomer or oligomer may be present at less than 2% by weight of the wall polymer. The acidic (meth)acrylate monomer or oligomer may be present at less than 2% by weight of the wall polymer.

The basic (meth)acrylate monomer, and/or oligomer or prepolymers thereof, may comprise one or more of an amine modified methacrylate, amine modified acrylate, a monomer such as mono or diacrylate amine, mono or dimethacrylate amine, amine modified polyether acrylate, amine modified polyether methacrylate, aminoalkyl acrylate, or aminoalkyl methacrylate. The amines can be primary, secondary or tertiary amines. Preferably the alkyl moieties of the basic (meth)acrylate monomer are C1 to C12.

Suitable amine (meth)acrylates for use in the particles of the present disclosure may include aminoalkyl acrylate or aminoalkyl methacrylate including, for example, but not by way of limitation, ethylaminoethyl acrylate, ethylaminoethyl methacrylate, aminoethyl acrylate, aminoethyl methacrylate, tertiarybutyl ethylamino acrylate, tertiarybutyl ethylamino methacrylate, tertiarybutyl aminoethyl acrylate, tertiarybutyl aminoethyl methacrylate, diethylamino acrylate, diethylamino methacrylate, diethylaminoethyl acrylate diethylaminoethyl methacrylate, dimethylaminoethyl acrylate and dimethylaminoethyl methacrylate. Preferably, the amine (meth)acrylate is aminoethyl acrylate or aminoethyl methacrylate, or tertiarybutyl aminoethyl methacrylate.

The acidic (meth)acrylate may comprise, by way of illustration, one or more of carboxy substituted acrylates or methacrylates, preferably carboxy substituted alkyl acrylates or methacrylates, such as carboxyalkyl acrylate, carboxyalkyl methacrylate, carboxyaryl acrylate, carboxy aryl methacrylate, and preferably the alky moieties are straight chain or branched C1 to C10. The carboxyl moiety can be bonded to any carbon of the C1 to C10 alkyl moiety, preferably a terminal carbon. Carboxy substituted aryl acrylates or methacrylates can also be used, or even (meth) acryloyloxyphenylalkylcarboxy acids. The alkyl moieties of the (meth)acryloyloxyphenylalkylcarboxy acids can be C1 to C10.

Suitable carboxy (meth)acrylates for use in particles of the present disclosure may include 2-carboxyethyl acrylate, 2-carboxyethyl methacrylate, 2-carboxypropyl acrylate, 2-carboxypropyl methacrylate, carboxyoctyl acrylate, carboxyoctyl methacrylate. Carboxy substituted aryl acrylates or methacrylates may include 2-acryloyloxybenzoic acid, 3-acryloyloxybenzoic acid, 4-acryloyloxybenzoic acid, 2-methacryloyloxybenzoic acid, 3-methacryloyloxybenzoic acid, and 4-methacryloyloxybenzoic acid. (Meth)acryloyloxyphenylalkylcarboxy acids by way of illustration and not limitation can include 4-acryloyloxyphenylacetic acid or 4-methacryloyloxyphenylacetic acid.

In addition to the oil-soluble or oil-dispersible multifunctional (meth)acrylate monomer or oligomer, the (meth) acrylate polymer of the polymer wall may be further derived from a water-soluble or water-dispersible mono- or multifunctional (meth)acrylate monomer or oligomer, which may include a hydrophilic functional group. The water-soluble or water-dispersible mono- or multifunctional (meth)acrylate monomer or oligomer may be preferably selected from the group consisting of amine (meth)acrylates, acidic (meth) acrylates, polyethylene glycol di(meth)acrylates, ethoxylated monofunctional (meth)acrylates, ethoxylated multifunctional (meth)acrylates, other (meth)acrylate monomers, other (meth)acrylate oligomers, and mixtures thereof. When making the delivery particle, optionally emulsifier may be included, preferably in the water phase. The emulsifier may be a polymeric emulsifier. Emulsifier can help with further stabilizing the emulsion. In formation of the polymer wall of the delivery particle, the polymeric emulsifier can become entrapped in the polymer wall material. These inclusions of emulsifier into the polymer wall usefully can be used to advantage in modification of polymer wall properties, influencing such attributes as flexibility, leakage, strength, and other properties. Thus, the polymer wall of the delivery particles may further comprise a polymeric emulsifier entrapped in the polymer wall, preferably wherein the polymeric emulsifier comprises polyvinyl alcohol. As indicated above, however, the entrapped polymeric emulsifier is not to be included when determining the core:wall polymer weight ratio.

The benefit agent delivery particle may comprise from about 0.5% to about 40%, preferably from about 0.5% to about 20%, more preferably 0.8% to 5% of an emulsifier, based on the weight of the wall material. Preferably, the emulsifier is selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water. The emulsifier preferably comprises polyvinyl alcohol, and the polyvinyl alcohol preferably has a hydrolysis degree from about 55% to about 99%, preferably from about 75% to about 95%, more preferably from about 85% to about 90% and most preferably from about 87% to about 89%. The polyvinyl alcohol may have a viscosity of from about 40 cps to about 80 cps, preferably from about 45 cps to about 72 cps, more preferably from about 45 cps to about 60 cps and most preferably 45 cps to 55 cps in an aqueous 4% polyvinyl alcohol solution at 20° C.; the viscosity of a polymer is determined by measuring a freshly made solution using a Brookfield LV type viscometer with UL adapter as described in British Standard EN ISO 15023-2:2006 Annex E Brookfield Test method. The polyvinyl alcohol may have a degree of polymerization of from about 1500 to about 2500, preferably from about 1600 to about 2200, more preferably from about 1600 to about 1900 and most preferably from about 1600 to about 1800. The weight average molecular weight of the polyvinyl alcohol may be of from about 130,000 to about 204,000 Daltons, preferably from about 146,000 to about 186,000, more preferably from about 146,000 to about 160,000, and most preferably from about 146,000 to about 155,000, and/or has a number average molecular weight of from about 65,000 to about 110,000 Daltons, preferably from about 70,000 to about 101,000, more preferably from about 70,000 to about 90,000 and most preferably from about 70,000 to about 80,000.

The (meth)acrylate polymer of the polymer wall may be further derived, at least in part, from at least one free radical initiator, preferably at least two free radical initiators. The at least one free radical initiator may preferably comprise a water-soluble or water-dispersible free radical initiator. One or more free radical initiators can provide a source of free radicals upon activation.

Without wishing to be bound by theory, it is believed that selecting the appropriate amount of initiator relative to total wall material (and/or wall monomers/oligomers) can result in improved capsules. For example, it is believed that levels of initiators that are too low may lead to poor polymer wall formation; levels that are too high may lead to encapsulate walls that have relatively low levels of structural monomers. In either situation, the resulting capsules may be relatively leaky and/or weak. It is further believed that the optimization of encapsulate wall formation, aided by proper selection of relative initiator level, is particularly important for capsules having relatively high core:wall ratios, given that the amount of wall material is relatively low.

Thus, the amount of initiator present may be from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the polymer wall (e.g., wall monomers plus initiators, excluding embedded polymeric emulsifiers, as described herein for core:wall ratios). It is believed that relatively higher amounts of initiator within the disclosed ranges may lead to improved, less-leaky capsules. The optimal amount of initiator may vary according to the nature of the core material. The (meth)acrylate polymer of the polymer wall may be derived from a first initiator and a second initiator, wherein the first and second initiators are present in a weight ratio of from about 5:1 to about 1:5, or preferably from about 3:1 to about 1:3, or more preferably from about 2:1 to about 1:2, or even more preferably from about 1.5:1 to about 1:1.5.

Suitable free radical initiators may include peroxy initiators, azo initiators, peroxides, and compounds such as 2,2'-azobismethylbutyronitrile, dibenzoyl peroxide. More particularly, and without limitation, the free radical initiator can be selected from the group of initiators comprising an azo or peroxy initiator, such as peroxide, dialkyl peroxide, alkylperoxide, peroxyester, peroxycarbonate, peroxyketone and peroxydicarbonate, 2,2'-azobis (isobutylnitrile), 2,2'-azobis (2,4-dimethylpentanenitrile), 2,2'-azobis (2,4-dimethylvaleronitrile), 2,2'-azobis(2-methylpropanenitrile), 2,2'-azobis (2-methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl) peroxydicarbonate, di(2-ethylhexyl)peroxydicarbonate, 1,1-dimethyl-3-hydroxybutyl peroxyneodecanoate, a-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, dit-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like.

The shell of the delivery particles may comprise a coating, for example on an outer surface of the shell, away from the core. The encapsulates may be manufactured and be subsequently coated with a coating material. The coating may be useful as a deposition aid. The coating may comprise a cationic material, such as a cationic polymer. As indicated above, however, a coating that is not a structural or support feature of the wall is not to be included in calculations when determining the core:wall polymer weight ratio.

Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise polyvinyl formamide, chitosan, or combinations thereof, preferably chitosan.

b. Benefit Agent

The delivery particles of the present disclosure include a core. The core may comprise a benefit agent. Suitable benefit agents located in the core may include benefit agents that provide benefits to a surface, such as a fabric or hair.

The core may comprise from about 45% to about 95%, preferably from about 50% to about 80%, more preferably from about 50% to about 70%, by weight of the core, of the benefit agent, which may preferably be a fragrance.

The benefit agent may be selected from the group consisting of fragrance, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes, and mixtures thereof.

The encapsulated benefit agent may preferably a fragrance, which may include one or more perfume raw materials. The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitriles and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The fragrance may comprise perfume raw materials that have a log P of from about 2.5 to about 4. It is understood that other perfume raw materials may also be present in the fragrance.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

c. Partitioning Modifier

The core of the delivery particles of the present disclosure may comprise a partitioning modifier. The properties of the oily material in the core can play a role in determining how much, how quickly, and/or how permeable the polyacrylate shell material will be when established at the oil/water interface. For example, if the oil phase comprises highly polar materials, these materials may reduce the diffusion of the acrylate oligomers and polymers to the oil/water interface and result in a very thin, highly permeable shell. Incorporation of a partitioning modifier can adjust the polarity of the core, thereby changing the partition coefficient of the polar materials in the partitioning modifier versus the acrylate oligomers, and can result in the establishment of a well-defined, highly impermeable shell. The partitioning modifier may be combined with the core's perfume oil material prior to incorporation of the wall-forming monomers.

The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl hehenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described delivery particles.

d. Method of Making Delivery Particles

Delivery particles may be made according to known methods, so long as the core:shell ratios described herein are observed. Methods may be further adjusted to arrive at other desirable characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more oil-soluble or dispersible multifunctional (meth)acrylate monomers or oligomers having at least three, and preferably at least four, at least five, or even at least six radical polymerizable functional groups with the proviso that at least one of the radical polymerizable groups is acrylate or methacrylate.

The oil-soluble or dispersible multifunctional (meth)acrylate monomers or oligomers are described in more detail above. Among other things, the oil-soluble or dispersible multifunctional (meth)acrylate monomers or oligomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer or oligomer may comprise one or more multifunctional aliphatic urethane acrylates, which may be dissolved or dispersed into the oil phase. The process may further comprise dissolving or dispersing one or more of an amine (meth)acrylate or an acidic (meth)acrylate into the oil phase.

The process may further comprise providing a water phase, which may comprise an emulsifier, a surfactant, or a combination thereof. The process may further comprise the step of dissolving or dispersing into the water phase one or more water-soluble or water-dispersible mono- or multifunctional (meth)acrylate monomers and/or oligomers.

The process may comprising a step of dissolving or dispersing in into the water phase, the oil phases, or both, of one or more amine (meth)acrylates, acidic (meth)acrylates, polyethylene glycol di(meth)acrylates, ethoxylated mono- or multi-functional (meth)acrylates, and/or other (meth)acrylate monomers and/or oligomers.

In general, the oil soluble multifunctional (meth)acrylate monomer is soluble or dispersible in the oil phase, typically soluble at least to the extent of 1 gram in 100 ml of the oil, or dispersible or emulsifiable therein at 22 C. The water soluble multifunctional (meth)acrylate monomers are typically soluble or dispersible in water, typically soluble at least to the extent of 1 gram in 100 ml of water, or dispersible therein at 22 C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished encapsulates.

The dissolved or dispersed monomers may be reacted by heating or actinic irradiation of the emulsion. The reaction can form a polymer wall at an interface of the droplets and the water phase. The radical polymerizable groups of the multifunctional methacrylate, upon heating, facilitate self-polymerization of the multifunctional methacrylate.

One or more free radical initiators may be provided to the oil phase, the water phase, or both, preferably both. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

Alternatively, the reacting step may be carried out in the absence of an initiator, as it has surprisingly been found that encapsulates may form, even when a free radical initiator is not present.

In the described process, the heating step may comprise heating the emulsion from about 1 hour to about 20 hours, preferably from about 2 hours to about 15 hours, more preferably about 4 hours to about 10 hours, most preferably from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, preferably from about 30 microns to about 50 microns, with a view to forming a population of delivery particles with a volume-weighted target size, for example, of from about 30 to about 50 microns.

The benefit agent may be selected as described above, and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 55% by weight of the core of the delivery particle.

As described above, it is desirable for the resulting delivery particles to be characterized by a core to polymer wall weight of from 96:4 to about 99.5:0.5. It is also desirable for the resulting delivery particles to be characterized by a volume-weighted median particle size of from about 30 to about 50 microns.

As a result of the method of making delivery particles provided herein, the delivery particles may be present in an aqueous slurry, for example, the particles may be present in the slurry at a level of from about 20% to about 60%, preferably from about 30% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

Exemplary synthesis methods that can form encapsulates according the present disclosure are further described in Example 1 below.

Consumer Product Adjunct Material

The compositions of the present disclosure, which may be consumer products, may comprise a consumer product adjunct material. The consumer product adjunct material may provide a benefit in the intended end-use of a composition, or it may be a processing and/or stability aid.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

Depending on the intended form, formulation, and/or end-use, compositions of the present disclosure or may not may not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

a. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine(e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

b. Conditioning Active

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 3:1, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

c. Deposition Aid

The compositions of the present disclosure may comprise a deposition aid. Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

d. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

Process of Making a Composition

The present disclosure relates to processes for making any of the compositions described herein. The process of making a composition, which may be a consumer product, may comprise the step of combining a delivery particle as described herein with a consumer product adjunct material as described herein.

The delivery particles may be combined with such one or more consumer product adjuncts materials when the delivery particles are in one or more forms, including a slurry form, neat delivery particle form, and/or spray dried delivery particle form. The delivery particles may be combined with such consumer product adjuncts materials by methods that include mixing and/or spraying.

The compositions of the present disclosure can be formulated into any suitable form and prepared by any process chosen by the formulator. The delivery particles and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

Method of Treating a Surface or Article

The present disclosure further relates to methods of treating a surface or article with a composition according to the present disclosure. Such methods may provide cleaning, conditioning, and/or freshening benefits.

Suitable surfaces or articles may include fabrics (including clothing, towels, or linens), hard surfaces (such as tile, porcelain, linoleum or wood floors), dishware, hair, skin, or mixtures thereof.

The method may include a step of contacting a surface or article with a composition of the present disclosure. The composition may be in neat form or diluted in a liquor, for example, a wash or rinse liquor. The composition may be diluted in water prior, during, or after contacting the surface or article. The surface or article may be optionally washed and/or rinsed before and/or after the contacting step.

The method of treating and/or cleaning a surface or article may include the steps of:

a) optionally washing, rinsing and/or drying the surface or article;

b) contacting the surface or article with a composition as described herein, optionally in the presence of water;

c) optionally washing and/or rinsing the surface or article; and d) optionally dried by drying passively and/or via an active method such as a laundry dryer.

For purposes of the present invention, washing includes but is not limited to, scrubbing, and mechanical agitation. The fabric may comprise most any fabric capable of being laundered or treated in normal consumer use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

Combinations

Specifically contemplated combinations of the disclosure are herein described in the following lettered paragraphs. These combinations are intended to be illustrative in nature and are not intended to be limiting.

A. A consumer product composition comprising: a treatment adjunct, and a population of delivery particles, wherein the delivery particles comprise a core and a polymer wall surrounding the core, wherein the core comprises a benefit agent and a partitioning modifier, wherein the partitioning modifier is present in the core at a level of from about 5% to about 55%, by weight of the core, wherein the polymer wall comprises a (meth)acrylate polymer derived, at least in part, from one or more oil-soluble or oil-dispersible multifunctional (meth)acrylate monomers or oligomers, the one or more oil-soluble or oil-dispersible multifunctional (meth)acrylate monomers or oligomers having at least three radical polymerizable functional groups, with the proviso that at least one of the radical polymerizable groups is acrylate or methacrylate; wherein the core and the polymer wall are present in a weight ratio of from about 96:4 to about 99.5:0.5; and wherein the delivery particles are characterized by a volume-weighted median particle size from about 30 to about 50 microns.

B. The consumer product composition according to paragraph A, wherein the delivery particles comprise the core and polymer wall present in a weight ratio of from about 97:3 to about 99:1, more preferably from about 98:2 to about 99:1.

C. The consumer product composition according to any of paragraphs A or B, wherein the one or more oil-soluble or dispersible multifunctional (meth)acrylate monomers or oligomers comprise at least four, preferably at least five, more preferably at least six, even more preferably exactly six, radical polymerizable functional groups.

D. The consumer product composition according to any of paragraphs A to C, wherein the radical polymerizable functional groups are each independently selected from the group consisting of acrylate and methacrylate.

E. The consumer product composition according to any of paragraphs A to D, wherein the oil-soluble or oil-dispersible multifunctional (meth)acrylate monomers or oligomers comprise a multifunctional aromatic urethane acrylate.

F. The consumer product composition according to any of paragraphs A to E, wherein the oil-soluble or oil-dispersible multifunctional (meth)acrylate monomers or oligomers comprise a hexafunctional aromatic urethane acrylate.

G. The consumer product composition according to any of paragraphs A to F, wherein the oil-soluble or oil-dispersible multifunctional (meth)acrylate monomers or oligomers comprise a multifunctional aliphatic urethane acrylate.

H. The consumer product composition according to any of paragraphs A to G, wherein the (meth)acrylate polymer is further derived from, at least in part, a monomer selected from an amine methacrylate, an acidic methacrylate, or a combination thereof.

I. The consumer product composition according to any of paragraphs A to H, wherein the (meth)acrylate polymer of the polymer wall is a reaction product derived from the oil-soluble or oil-dispersible multifunctional (meth)acrylate, a second monomer, and a third monomer, preferably wherein the second monomer comprises a basic (meth)acrylate monomer, and wherein the third monomer comprises an acidic (meth)acrylate monomer.

J. The consumer product composition according to any of paragraphs A to I, wherein the (meth)acrylate polymer of the polymer wall is further derived from a water-soluble or water-dispersible mono- or multifunctional (meth)acrylate monomer or oligomer, preferably selected from the group consisting of amine (meth)acrylates, acidic (meth)acrylates, polyethylene glycol di(meth)acrylates, ethoxylated monofunctional (meth)acrylates, ethoxylated multi-functional (meth)acrylates, other (meth)acrylate monomers, other (meth)acrylate oligomers, and mixtures thereof.

K. The consumer product composition according to any of paragraphs A to J, wherein the polymer wall of the delivery particles further comprise a polymeric emulsifier entrapped in the polymer wall, preferably wherein the polymeric emulsifier comprises polyvinyl alcohol.

L. The consumer product composition according to any of paragraphs A to K, wherein the (meth)acrylate polymer of the polymer wall is further derived, at least in part, from at least one free radical initiator, preferably wherein the at least one free radical initiator comprises a water-soluble or water-dispersible free radical initiator, more preferably wherein the at least one free radical initiator comprises a water-soluble or water-dispersible free radical initiator and an oil-soluble or oil-dispersible free radical initiator.

M. The consumer product composition according to any of paragraphs A-L, wherein the free radical initiator is present in amount of from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the polymer wall.

N. The consumer product composition according to any of paragraphs A to M, wherein the benefit agent is a fragrance, preferably a fragrance comprising perfume raw materials characterized by a log P of from about 2.5 to about 4.

O. The consumer product composition according to any of paragraphs A to N, wherein the partitioning modifier is selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate.

P. The consumer product composition according to any of paragraphs A to O, wherein the population of delivery particles are characterized by an average Fracture Strength of from about 0.2 to about 10 MPa, preferably from about 0.5 to about 8 MPa, more preferably from about 0.5 to about 5 MPa.

Q. The consumer product composition according to any of paragraphs A to P, wherein the polymer wall of the delivery particles further comprises a coating material, preferably wherein the coating material is selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines, copolymers of polyvinyl amines, and mixtures thereof.

R. The consumer product composition according to any of paragraphs A to Q, wherein the delivery particles are characterized by a volume-weighted median particle size from about 30 to about 40 microns.

S. The consumer product composition according to any of paragraphs A to R, wherein the composition comprises from about 0.05% to about 20%, preferably from about 0.05% to about 10%, more preferably from about 0.1% to about 5%, even more preferably from about 0.2% to about 2%, by weight of the composition, of the delivery particles.

T. The consumer product composition according to any of paragraphs A to S, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

U. The consumer product composition according to any of paragraphs A to T, wherein the composition is a fabric care composition, a hard surface cleaner composition, a dish care composition, a hair care composition, a body cleansing composition, or a mixture thereof, preferably a fabric care composition, preferably a fabric care composition that is a laundry detergent composition, a fabric conditioning composition, a laundry additive, a fabric pre-treat composition, a fabric refresher composition, or a mixture thereof.

V. The consumer product composition according to any of paragraphs A to U, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

W. A method of treating a surface, wherein the method comprises the step of contacting the surface with a consumer product composition according to any of paragraphs A-V, optionally in the presence of water.

Test Methods

It is understood that the test methods that are disclosed in the Test Methods Section of the present application should be used to determine the respective values of the parameters of Applicant's claimed subject matter as claimed and described herein.

Extraction of Delivery Particles from Finished Products.

Except where otherwise specified herein, the preferred method to isolate delivery particles from finished products is based on the fact that the density of most such delivery particles is different from that of water. The finished product is mixed with water in order to dilute and/or release the delivery particles. The diluted product suspension is centrifuged to speed up the separation of the delivery particles. Such delivery particles tend to float or sink in the diluted solution/dispersion of the finished product. Using a pipette or spatula, the top and bottom layers of this suspension are removed and undergo further rounds of dilution and centrifugation to separate and enrich the delivery particles. The delivery particles are observed using an optical microscope equipped with crossed-polarized filters or differential interference contrast (DIC), at total magnifications of 100× and 400×. The microscopic observations provide an initial indication of the presence, size, quality and aggregation of the delivery particles.

For extraction of delivery particles from a liquid fabric enhancer finished product conduct the following procedure:
1. Place three aliquots of approximately 20 ml of liquid fabric enhancer into three separate 50 ml centrifuge tubes and dilute each aliquot 1:1 with DI water (e.g. 20 ml fabric enhancer +20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched delivery particles appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the delivery particle enriched and isolated top and bottom layers back together.

If the fabric enhancer has a white color or is difficult to distinguish the delivery particle enriched layers add 4 drops of dye (such as Liquitint Blue JH 5% premix from Milliken & Company, Spartanburg, South Carolina, USA) into the centrifuge tube of step 1 and proceed with the isolation as described.

For extraction of delivery particles from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting delivery particles from finished products which do not disperse readily in water, such as waxes, dryer sheets, dryer bars, and greasy materials, it may be necessary to add detergents, agitation, and/or gently heat the product and diluent in order to release the delivery particles from the matrix. The use of organic solvents or drying out of the delivery particles should be avoided during the extraction steps as these actions may damage the delivery particles during this phase.

For extraction of delivery particles from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 1 to 4 g NaCl) can be added to the diluted suspension in order to increase the density of the solution and facilitate the delivery particles floating to the top layer. If the product has a white color which makes it difficult to distinguish the layers of delivery particles formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient delivery particles for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If delivery particles are observed microscopically in both the top and bottom layers, then the delivery particles from these two layers are recombined after the final centrifugation step, to create a single sample containing all the delivery particles extracted from that product. The extracted delivery particles should be analyzed as soon as possible but may be stored as a suspension in DI water for up to 14 days before they are analyzed.

One skilled in the art will recognize that various other protocols may be constructed for the extraction and isolation of delivery particles from finished products and will recognize that such methods require validation via a comparison of the resulting measured values, as measured before and after the delivery particles' addition to and extraction from finished product.

Benefit Agent Leakage

The amount of benefit agent leakage from the delivery particles is determined according to the following method:
a.) Obtain two samples of the raw material slurry of delivery particles in such amounts so that 1 g of encapsulated perfume (e.g., 1 g perfume oil, not including the shell and/or partitioning modifier, if present) is present in each sample (or other amount as so indicated).
b.) Add one sample of the raw material slurry of delivery particles to a suitable amount of the product matrix (e.g., a liquid detergent product or an LFE product) in which the delivery particles will be employed to form 100 g total (e.g., 5 g slurry and 95 g product matrix) and label the mixture as Sample 1. Immediately use the second sample of raw material delivery particle slurry in Step d below, in its neat form without contacting product matrix, and label it as Sample 2.
c.) Age the delivery-particle-containing product matrix (Sample 1) for one week at 35° C. (or other time and/or temperature, as so indicated) in a sealed, glass jar.
d.) Using filtration, recover the delivery particles from both samples. The delivery particles in Sample 1 (in product matrix) are recovered after the aging step. The delivery particles in Sample 2 (neat raw material slurry) are recovered at the same time that the aging step began for sample 1.
e.) Treat the recovered delivery particles with a solvent to extract the benefit agent materials from the delivery particles.
f.) Analyze the solvent containing the extracted benefit agent from each sample, via chromatography. Integrate the resultant benefit agent peak areas under the curve and sum these areas to determine the total quantity of benefit agent extracted from each sample.
g.) Determine the percentage of benefit agent leakage by calculating the difference in the values obtained for the total quantity of benefit agent extracted from Sample 2 minus Sample 1, expressed as a percentage of the total quantity of benefit agent extracted from Sample 2, as represented in the equation below:

$$\text{Percentage of Benefit Agent Leakage} = \left(\frac{\text{Sample 2} - \text{Sample 1}}{\text{Sample 2}}\right) \times 100$$

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 s$^{-1}$ and low shear viscosity at 0.05 s$^{-1}$ is obtained from a logarithmic shear rate sweep from 0.01 s$^{-1}$ to 25 s$^{-1}$ in 3 minutes time at 21° C.

Perfume, Perfume Raw Materials (PRMs), and/or Partitioning Modifier

A. Identity and Total Quantity

To determine the identity and to quantify the total weight of perfume, perfume ingredients, or Perfume Raw Materials (PRMs), or partitioning modifier in the capsule slurry, and/or encapsulated within the delivery agent encapsulates, Gas Chromatography with Mass Spectroscopy/Flame Ionization Detector (GC-MS/FID) is employed. Suitable equipment includes: Agilent Technologies G1530A GC/FID; Hewlett Packer Mass Selective Device 5973; and 5%-Phenylmethyipolysiioxane Column J&W DB-5 (30 m length×0.25 mm internal diameter×0.25 μm film thickness). Approximately 3 g of the finished product or suspension of delivery encapsulates, is weighed and the weight recorded, then the sample is diluted with 30 mL of DI water and filtered through a 5.0 μm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 μm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

B. Amount of Non-Encapsulated Material

In order to determine the amount of non-encapsulated perfume and (optionally) partitioning modifier material in a composition such as a slurry, the following equipment can be used for this analysis, using the analysis procedure provided after the table.

| Gas chromatograph/MS | Agilent GC6890 equipped with Agilent 5973N mass spectrometer or equivalent, capillary column operation, quantiation based on extracted ion capability, autosampler |
|---|---|
| Column for GC-MS | 30 m x 0.25 mm nominal diameter, 0.25 μm film thickness, J & W 122-5532 DB-5, or equivalent. |

To prepare a perfume standard in ISS Hexane, weigh 0.050+/−0.005 g of the desired PMC perfume oil into a 50 mL volumetric flask (or other volumetric size recalculating g of perfume oil to add). Fill to line with ISS Hexane solution from above. The ISS Hexane is a 0.1 g of Tetradecane in 4 liters of hexane.

To prepare a 5% surfactant solution, weigh 50 g+/−1 g of the sodium dodecyl sulphate in a beaker and, using purified water, transfer quantitatively to a 1 liter volumetric flask, and ensure the surfactant is fully dissolved.

To prepare the sample of the PMC composition (e.g., a slurry), confirm the composition (e.g., a slurry) is well mixed; mix if necessary. Weigh 0.3+/−0.05 g of composition sample onto the bottom of a 10 mL vial. Avoid composition on the wall of the vial.

To operate the instrument, determine a target ion for quantification for each PRM (and optionally partitioning modifier) along with a minimum of one qualifier ion, preferably two. Calibration curves are generated from the Perfume standard for each PRM. Utilizing the sample weight and individual PRM weight %, the integration of the extracted ion (EIC) for each PRM and the amount are plotted or recorded.

The amount of free oil is determined from the response of each PRM versus the calibration curve and summed over all the different perfume materials and optionally the partitioning modifier.

C. Determination of Encapsulated Material

The determination of the encapsulated oil and optionally the partitioning modifier is done by the subtraction of the weight of free/non-encapsulated oil found in the composition from the amount by weight of total oil found in the composition (e.g. a slurry).

Analytical Determination of Wall Materials

This method determines the amount of wall material. First, the wall material of particles with size larger than 0.45 micrometer are isolated via dead-end filtration. Subsequent analysis by thermogravimetric analysis allows for elimination of inorganic material and other (organic) raw material slurry ingredients.

A. Sample Preparation

The procedure applies dead-end filtration to eliminate soluble fractions of the sample. Different solvents in succession are used to maximize the removal of interfering substances prior to TGA analysis.

The following materials and/or equipment are used:
Filtration Equipment
  Vacuum pump: Millipore Model WP6122050 or equivalent.
  Thick walled vacuum tubing to connect pump with filtration device.
  Filtrations flasks 500 or 1000 ml.
  Filtration cup: e.g. 250 ml Millipore Filtration funnel ("Milli Cup"), filtration material: 0.45 micrometer membrane, solvent resistant.
  Sealable Plastic container to contain the filtration device while weighing.
  Standard laboratory glassware (glass beakers 100-250 ml, measuring cylinders 50-250 ml).
Drying Equipment
  Vacuum oven and vacuum pump (settings 60-70 C/vacuum: 30-inch Mercury vacuum).
  Desiccator or constant humidity chamber (keeping residues under controlled environment during cooling.
Solvents
  All solvents: Analytical Grade minimum: 2-Propanol, Acetone, Chloroform The filtration procedure is as follows: To prepare the filtration device, record the weight of a pre-dried filtration device (e.g. Milli cup filter) down to 0.1-0.2 mg. Pre-drying involves the same drying steps as done for the filter after filtration is completed.

Filter the sample by weighing between 1 and 2 grams of Slurry Raw Material (note weight down to 0.1-0.2 mg) into a glass beaker (250 ml), or directly into the filtration device. Add 20 ml of deionized water and swirl to homogenize the sample. Add 80 ml of isopropylalcohol and homogenize sample with solvent; use heating to flocculate the sample. Put the filtration device onto a filtration bottle, and start up filtration with vacuum. After filtration is complete, add 100 ml Chloroform. Continue filtration. Add 10-20 ml Acetone and filter through the membrane to remove traces of chloroform. Remove the filter from the filtration system and dry it in a vacuum oven. After cooling, weigh the filter and record the weight.

Calculate the percent residue (gravimetric residue) by dividing the weight difference of Filter+Residue and Filter weight only (=net weight of residue after filtration) by the Raw Material Slurry sample weight and multiply by 100 to obtain % units. Continue with the measurement of % Residue via TGA analysis.

Thermo Gravimetric Analysis (TGA) is performed with the following equipment and settings: TGA: TA instruments Discovery TGA; Pans: Sealed Aluminum; Purge: N2 at 50 ml/min; Procedure: Ramp 10° C./min to 500° C.; TGA is coupled to a Nicolet Nexus 470 FTIR spectrometer for evolved gas.

For TGA data analysis, the weight loss between 350 and 500° C. is due to decomposition of polymer wall material of the perfume micro capsules and still residual (burned)

perfume compounds. For calculation of insoluble polymer fraction this weight loss is used. At 500° C. there is still a residue which is un-burned material and should be considered when calculating the insoluble polymer fraction.

Analytical Determination of the Core:Wall Ratio

When the amount of core and wall material inputs are not readily available, the core:wall ratio of the encapsulates may be determined analytically using the methods described herein.

More specifically, the methods above allow determination (in weight) the amounts of perfume, partitioning modifier, and wall materials in the perfume capsule composition (e.g., a slurry) and can be used to calculate the core:wall ratio. This is done by dividing the total amount (by weight) of perfume plus partitioning modifier found in the composition divided by the amount (by weight) of cross-linked wall material found in the composition.

Test Method for Determining log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted capsule size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/50$^{th}$ percentile, 5$^{th}$ percentile, and/or 90$^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

Broadness Index=((90% size)–(5% size))/50% size.

Fracture Strength Test Method

To measure average Fracture Strength for the population, and/or determine Delta Fracture Strength, three different measurements are made: i) the volume-weighted capsule size distribution; ii) the diameter of 10 individual capsules within each of 3 specified size ranges (and/or 30 individual capsules at the median volume-weighted particle size, if average Fracture Strength is to be determined), and; iii) the rupture-force of those same 30 individual capsules.

a.) The volume-weighted capsule size distribution is determined as described above. The resulting volume-weighted PSD data are plotted and recorded, and the values of the median, 5$^{th}$ percentile, and 90$^{th}$ percentile are determined.

b.) The diameter and the rupture-force value (also known as the bursting-force value) of individual capsules are measured via a custom computer-controlled micromanipulation instrument system which possesses lenses and cameras able to image the delivery capsules, and which possess a fine, flat-ended probe connected to a force-transducer (such as the Model 403A available from Aurora Scientific Inc, Canada) or equivalent, as described in: Zhang, Z. et al. (1999) "Mechanical strength of single microcapsules determined by a novel micromanipulation technique." I Microencapsulation, vol 16, no. 1, pages 117-124, and in: Sun, G. and Zhang, Z. (2001) "Mechanical Properties of Melamine-Formaldehyde microcapsules." I Microencapsulation, vol 18, no. 5, pages 593-602, and as available at the University of Birmingham, Edgbaston, Birmingham, UK.

c.) A drop of the delivery capsule suspension is placed onto a glass microscope slide, and dried under ambient conditions for several minutes to remove the water and achieve a sparse, single layer of solitary capsules on the dry slide. Adjust the concentration of capsules in the suspension as needed to achieve a suitable capsule density on the slide. More than one slide preparation may be needed.

d.) The slide is then placed on a sample-holding stage of the micromanipulation instrument. Thirty benefit delivery capsules on the slide(s) are selected for measurement, such that there are ten capsules selected within each of three pre-determined size bands. Each size band refers to the diameter of the capsules as derived from the Accusizer-generated volume-weighted PSD. The three size bands of capsules are: the Median/50$^{th}$ Percentile Diameter+/–2 μm; the 5$^{th}$ Percentile Diameter+/–2 μm; and the 90$^{th}$ Percentile Diameter +/–2 μm. Capsules which appear deflated, leaking or damaged are excluded from the selection process and are not measured.
  i. If enough capsules are not available at a particular size band +/–2 μm, then the size band may be increased to +/–5 μm.
  ii. If average Fracture Strength for the population is to be determined, then 30 (or more) capsules at the median/50$^{th}$ Percentile size band may be measured.

e.) For each of the 30 selected capsules, the diameter of the capsule is measured from the image on the micromanipulator and recorded. That same capsule is then compressed between two flat surfaces, namely the flat-ended force probe and the glass microscope slide, at a speed of 2 μm per second, until the capsule is ruptured. During the compression step, the probe force is continuously measured and recorded by the data acquisition system of the micromanipulation instrument.

f.) The cross-sectional area is calculated for each of the selected capsules, using the diameter measured and assuming a spherical capsule ($\pi r^2$, where r is the radius of the capsule before compression). The rupture force is determined for each selected capsule from the recorded force probe measurements, as demonstrated in Zhang, Z. et al. (1999) "Mechanical strength of single microcapsules determined by a novel micromanipulation technique." J. Microencapsulation, vol 16, no. 1, pages 117-124, and in: Sun, G. and Zhang, Z. (2001)

"Mechanical Properties of Melamine-Formaldehyde microcapsules." *J. Microencapsulation*, vol 18, no. 5, pages 593-602.

g.) The Fracture Strength of each of the 30 capsules is calculated by dividing the rupture force (in Newtons) by the calculated cross-sectional area of the respective capsule.

h.) Calculations:

Average Fracture Strength for the population is determined by averaging the Fracture Strength values of (at least) thirty capsules at the Median/50$^{th}$ Percentile size band.

The Delta Fracture Strength is calculated as follows:

$$\text{Delta Fracture Strength (\%)} = \frac{FS@d_5 - FS@d_{90}}{FS@d_{50}} * 100$$

where FS at $d_i$ is the FS of the capsules at the percentile i of the volume-weighted size distribution.

EXAMPLES

The examples provided below are intended to be illustrative in nature and are not intended to be limiting.

Example 1. Exemplary Synthesis of Delivery Particles

Exemplary synthesis processes for different delivery particles are provided below. Details for the materials used are provided in Table 1.

A. Process description for preparing 18 or 36 micron capsules—98:2 core to wall ratio "(C:W)" and 40% IPM with CN975.

To a 1L capacity water jacketed stainless steel reactor, 143.12 grams of perfume oil and 137.45 grams of isopropyl myristate are added and allowed to mix with the aid of a high shear mixer fitted with a mill blade, under a nitrogen environment. The solution is heated to 35 C before introducing 0.33 grams of Vazo67 (initiator) and the total mixture is subsequently heated to 70 C and is maintained at that temperature for 45 minutes before cooling the system down to 50 C. As soon as the temperature was reached, a solution, prepared separately, containing 63.05 grams of perfume oil, 0.075 grams of CD9055, 0.075 grams of TBAEMA, and 6.23 grams of CN975 is introduced into the reactor and the total mixture is allowed to mix for 10 min while at 50 C. The water phase, consisting of 107 grams of emulsifier (5% solution of PVOH 540), 340.03 grams of RO water, 0.22 grams of V-501, and 0.21 grams of NaOH (21% solution) is then added to the reactor, after stopping agitation. Milling ensues after the addition of the water phase until the particle size was reached. The emulsion is then heated first to 75 C and maintained at that temperature for 240 minutes and then heated to 95 C for 360 min before cooling it down to 25 C. At that point, the slurry is evacuated from the reactor into a container to add the rheology modifier (Xanthan gum 1.59 grams) and preservative (Acticide BWS-10; 0.61 grams). The rheology modifier is allowed to mix in for 30 min. The preservative is added last and allowed to mix for 5-10 min. The finished slurry is then characterized and tested as deemed fit.

Delivery particle examples 1 and 3, as described below in Example 2, Table 2, are synthesized in substantial accordance to this process.

Core:Wall Weight Ratio—Sample Calculation

The core:wall weight ratio is determined by dividing the weight of the total core material inputs (e.g., perfume oil and partitioning modifier) by the weight of the total wall material inputs (e.g., wall monomers and initiators). Alternatively, the relative percentage of core material in the particle population can be determined by dividing the weight of the total core material inputs by the sum of the total weight of the core material inputs plus the total weight of the wall material inputs and multiplying by 100; the remaining percentage (100-% core) is the relative percentage of the wall material—these numbers may then be expressed as a ratio. Similarly, the relative percentage of wall material in the particle population can be determined by dividing the total weight of the wall material inputs by the sum of the weights of the total core material inputs and the total wall material inputs and multiplying by 100.

A sample calculation for the "98:2" capsules formed by the example of this section is provided below, where the core comprises the perfume oil and a partitioning modifier (isopropyl myristate), and the wall comprises the wall monomers (CN975, CD9055, and TBAEMA) and the initiators (Vazo67 and V-501).

$$\% \text{ core} = \frac{(\text{perfume oil} + \text{partitioning modifier})}{(\text{perfume oil} + \text{partitioning modifier} + \text{wall monomers} + \text{initiators})} \times 100$$

$$\% \text{ core} = \frac{(143.12g + 63.05g + 137.45g)}{(143.12g + 63.05g + 137.45g + 6.23g + 0.075g + 0.075g + 0.33g + 0.22g)} \times 100$$

$$\% \text{ core} = \frac{343.62}{350.55} \times 100 = 98.02\% \text{ core material (and 1.98\% wall material)}$$

B. Process description for preparing 18 or 36 micron capsules—98:2 (C:W) and 40% IPM with SR295, EB140, EB895, TMPTA, SR444, or SR368

Process is the same as described in A, except the CN975 is replaced with each of the indicated monomers. The weight demand in grams for the monomer is held constant.

Delivery particle examples 4-10, 12, 14, 16, 18, and 20, as described below in Example 2, Table 2, are synthesized in substantial accordance to this process.

C. Process description for preparing 36 micron capsules—98:2 (C:W) and 0% IPM with CN975, SR295, EB140, EB895, TMPTA, SR444, or SR368

Process is the same as described in A or B, except no IPM was used. For each of these examples, the demand for IPM is replaced with perfume oil regardless of which monomer was used.

Delivery particle examples 2, 11, 13, 15, 17, 19, and 21, as described below in Example 2, Table 2, are synthesized in substantial accordance to this process.

D. Process description for preparing 18 or 36 micron capsules—98:2 (C:W) and 40% IPM with SR295, EB140, EB895, TMPTA, SR444, SR368, and CN975 and no minor wall monomers.

The same as A, except the 0.08 grams of CD9055 and 0.08 grams of TBAEMA are removed and the quantity called for is substituted with CN975 or other monomer, as indicated.

Delivery particle examples 25 and 26 as described below in Example 2, Table 2, are synthesized in substantial accordance to this process.

E. Process description for preparing 18 or 36 micron capsules—90:10 (C:W) and 40%/0% IPM with CN975

Substantially the same as A (for those with 40% IPM) or as C (for those with 0% IPM), except that the weight ratios of the core material and the wall material are adjusted so as to provide a 90:10 core:polymer wall weight ratio.

Delivery particle examples 22-24, as described below in Example 2, Table 2, are synthesized in substantial accordance with this process.

TABLE 1

| Name | Company/City | Chemical Description |
|---|---|---|
| CN975 | Sartomer Company, Exton, PA | hexafunctional urethane acrylate ester |
| EB140 | Allnex USA, Inc., Alpharetta, GA | ditrimethylolpropane tetraacrylate |
| SR295 | Sartomer Company, Exton, PA | pentaerythritol tetraacrylate |
| SR444 | Sartomer Company, Exton, PA | pentaerythritol triacrylate |
| TMPTA-1 | Allnex USA, Inc., Alpharetta, GA | trimethylolpropane triacrylate |
| SR368 | Sartomer Company, Exton, PA | tris (2-hydroxyethyl) isocyanurate triacrylate with aliphatic urethane acrylate |
| EB895 | Allnex USA, Inc., Alpharetta, GA | dipentaerythritol penta/hexa acrylate |
| TBAEMA | NovaSol North America Inc., Stoney Creek, ON, Canada | 2-(tert-butylamino) ethyl methacrylate |
| CD9055 | Sartomer Company, Exton, PA | acid acrylate |
| Vazo 67 (initiator) | Chemours Company, Wilmington, DE | 2,2'-azobis (2-methylbutyronitrile) |
| V-501 (initiator) | Sigma-Aldrich Corp., St. Louis, MO | 4,4'-Azobis(4-cyanovaleric acid) |

Example 2. Properties of Various Delivery Particles

Various properties for delivery particles synthesized according to the processes described in Example 1 are provided below in Table 2. The value of "free oil" is given as a percentage (wt %) of the perfume oil that remains unencapsulated in the slurry after formation of the capsules; lower free oil values indicate that the encapsulation process was more efficient (e.g., relatively greater amounts of perfume oil is encapsulated). Leakage is determined in a heavy-duty liquid (HDL) detergent product after one week of storage at 35° C.; the leakage values in Table 2 are provided in (%) and are determined by headspace analysis above neat product.

In addition to the data presented in Table 2, results are presented graphically in FIGS. 1-4.

FIG. 1 is a graph depicting percent leakage of perfume delivery particles according to the present disclosure, prepared at 18 and 36 micron diameter, and compared to 36 micron microcapsules in the absence of isopropyl myristate using (meth)acrylate monomers of various functionality as indicated.

Figure 2:
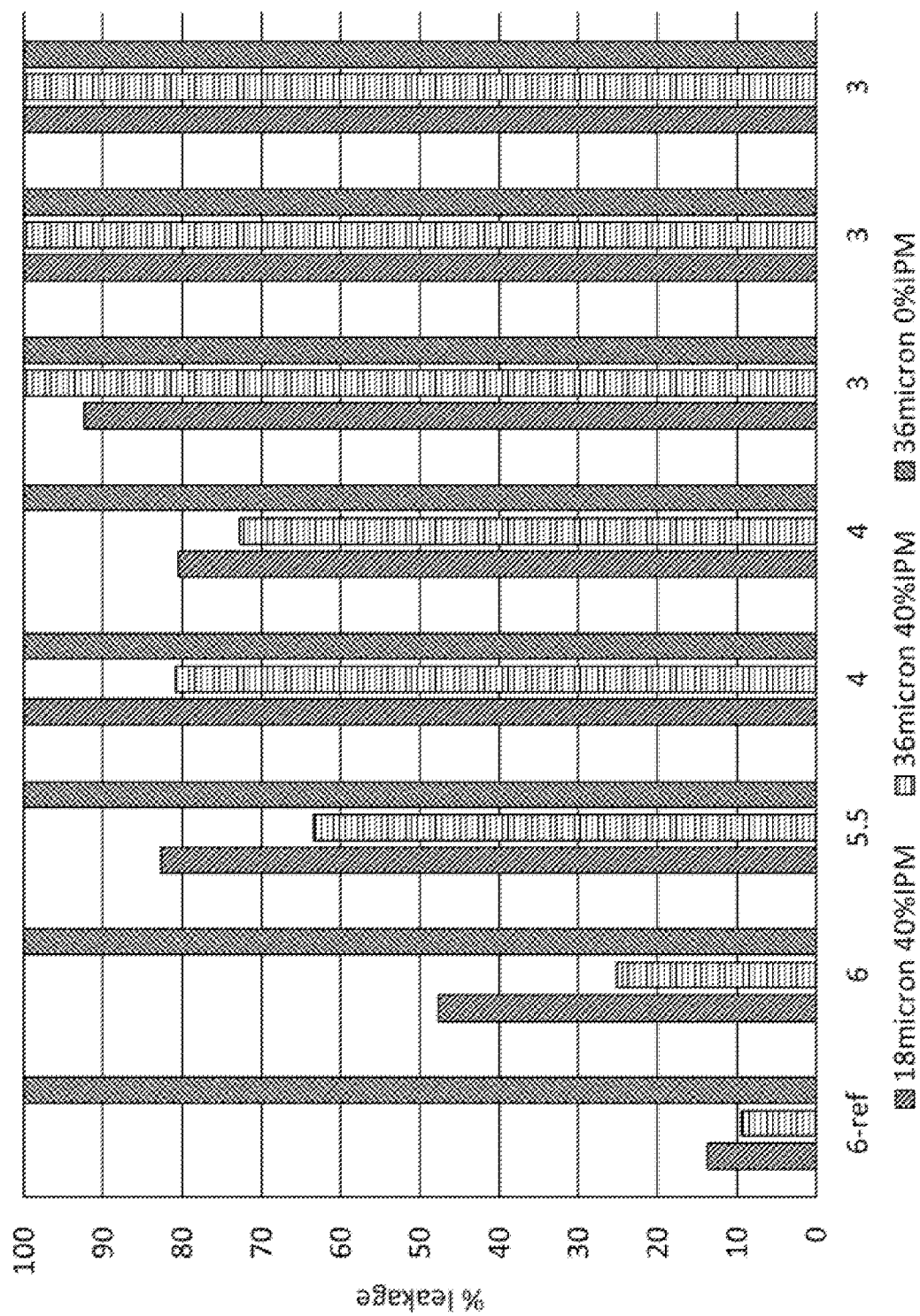
FIG. 2 is a graph depicting 1-week leakage of 18 and 36 micron diameter particles with (meth)acrylate monomers of various functionality. Measurement is at 1 week with particles dispersed in liquid laundry detergent measured at 35 degrees C. The control is the same capsule at 36 micron without any isopropyl myristate.

FIG. 2 is a graph depicting 1-week leakage of 18 and 36 micron diameter particles with (meth)acrylate monomers of various functionality. Measurement is at 1 week with particles dispersed in liquid laundry detergent measured at 35 degrees C. The control is the same capsule at 36 micron without any isopropyl myristate.

TABLE 2

| Delivery Particle Ex. # | Wt. Ratio (core to wall polymer) | Wall monomer | Functionality | % IPM | Particle Size (in microns +/- 3 μm) | Broadness index | Free oil | 1-wk leakage (in HDL) |
|---|---|---|---|---|---|---|---|---|
| 1 | 98/2 | CN975 | 6 | 40 | 36.07 | 1.15 | 0.53 | 25.16 |
| 2 | 98/2 | CN975 | 6 | 0 | 34.78 | 1.15 | 22.31 | 100.00 |
| 3 | 98/2 | CN975 | 6 | 40 | 18.96 | 1.31 | 1.20 | 47.65 |
| 4 | 98/2 | EB140 | 4 | 40 | 35.21 | 1.23 | 1.95 | 80.76 |
| 5 | 98/2 | SR295 | 4 | 40 | 35.64 | 1.23 | 1.52 | 72.81 |
| 6 | 98/2 | SR444 | 3 | 40 | 36.07 | 1.10 | 9.83 | 100.00 |
| 7 | 98/2 | TMPTA-1 | 3 | 40 | 34.78 | 1.23 | 10.44 | 100.00 |
| 8 | 98/2 | SR368 | 3 | 40 | 36.07 | 1.14 | 8.05 | 100.00 |
| 9 | 98/2 | EB895 | 5/6 | 40 | 33.95 | 1.17 | 0.78 | 63.39 |
| 10 | 98/2 | SR368 | 3 | 40 | 19.66 | 1.29 | 5.22 | 100.00 |
| 11 | 98/2 | SR368 | 3 | 0 | 33.95 | 1.20 | 14.56 | 100.00 |
| 12 | 98/2 | EB895 | 5/6 | 40 | 17.63 | 1.30 | 2.06 | 82.64 |
| 13 | 98/2 | EB895 | 5/6 | 0 | 36.07 | 1.12 | 15.97 | 100.00 |
| 14 | 98/2 | EB140 | 4 | 40 | 17.63 | 1.20 | 11.02 | 100.00 |
| 15 | 98/2 | EB140 | 4 | 0 | 34.36 | 1.15 | 27.08 | 100.00 |
| 16 | 98/2 | SR444 | 3 | 40 | 18.50 | 1.30 | 3.31 | 92.34 |
| 17 | 98/2 | SR444 | 3 | 0 | 34.78 | 1.09 | 16.80 | 100.00 |
| 18 | 98/2 | TMPTA-1 | 3 | 40 | 19.42 | 1.21 | 10.63 | 100.00 |
| 19 | 98/2 | TMPTA-1 | 3 | 0 | 34.78 | 1.04 | 23.48 | 100.00 |
| 20 | 98/2 | SR295 | 4 | 40 | 18.73 | 1.34 | 1.64 | 80.50 |
| 21 | 98/2 | SR295 | 4 | 0 | 35.64 | 1.17 | 17.87 | 100.00 |
| 22 | 90/10 | CN975 | 6 | 40 | 19.66 | 1.32 | 0.13 | 13.70 |
| 23 | 90/10 | CN975 | 6 | 40 | 36.07 | 1.24 | 0.10 | 9.48 |
| 24 | 90/10 | CN975 | 6 | 0 | 36.96 | 1.25 | 0.83 | 100.00 |
| 25 | 98/2 | CN975 | 6 | 40 | 36.07 | 1.18 | 0.14 | 17.06 |
| 26 | 98/2 | SR295 | 4 | 40 | 36.96 | 1.17 | 0.21 | 46.14 |

Figure 3:
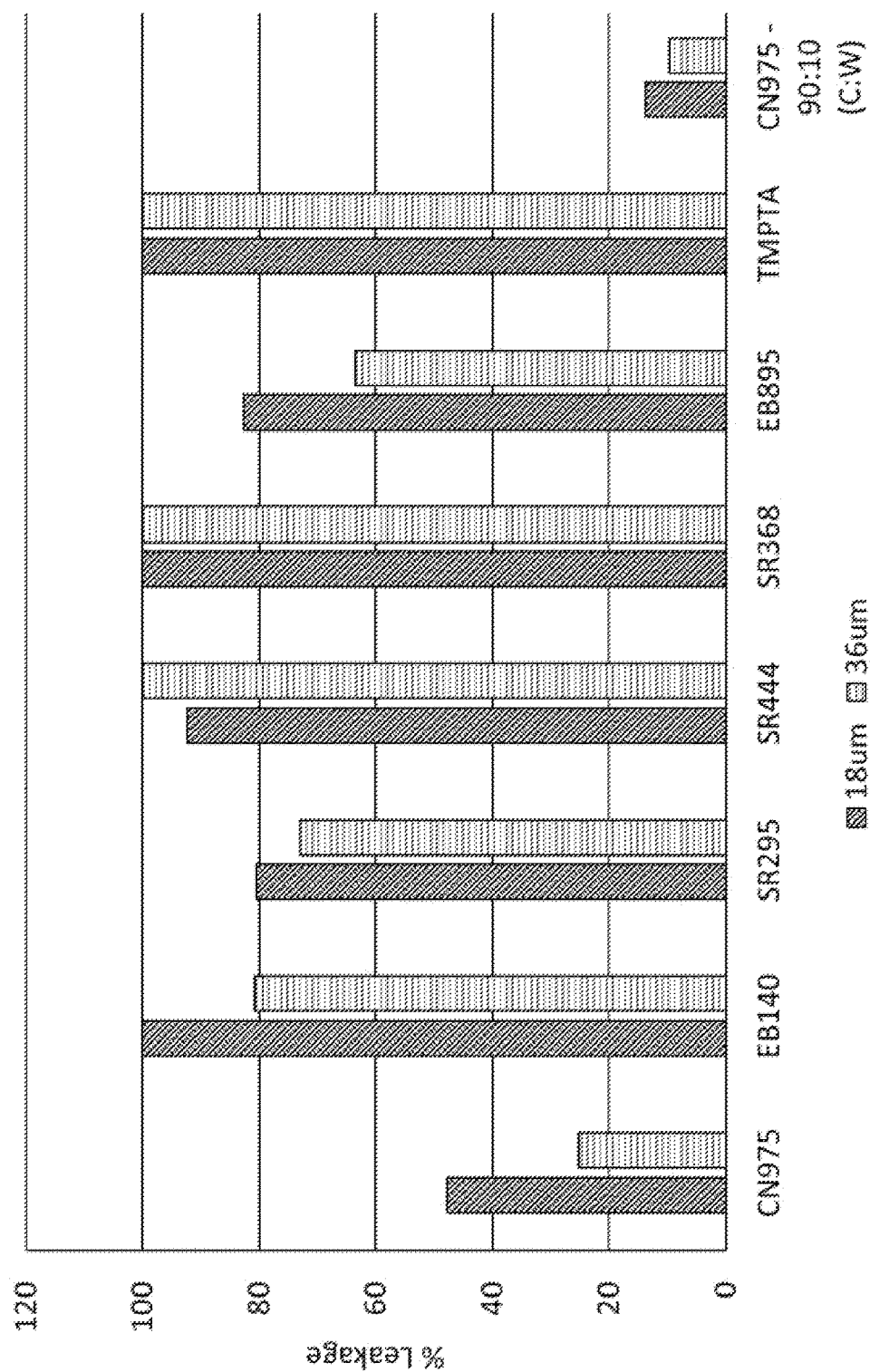
FIG. 3 is a graph depicting the quantity of free oil as a percentage obtained from perfume delivery particles prepared at 18 and 36 micron diameter, using the wall material indicated.

FIG. 3 is a graph depicting the quantity of free oil as a percentage obtained from perfume delivery particles prepared at 18 and 36 micron diameter, using the wall material indicated.

Figure 4:
FIG. 4 is a graph depicting the percent leakage by weight of delivery particles prepared at 18 and 36 micron diameters using various walls at 40% isopropyl myristate by weight of the core.

FIG. 4 is a graph depicting the percent leakage by weight of delivery particles prepared at 18 and 36 micron diameters using various walls at 40% isopropyl myristate by weight of the core.

As shown in Table 2 and the figures, delivery particles having the preferred combination of monomer selection, core:polymer wall weight ratio, particle size, and partitioning modifier in accordance with the present disclosure tend to manifest relatively low levels of leakage.

Example 3. Performance Data

To compare delivery particles of different core:wall polymer ratios and of different sizes, samples of liquid fabric enhancers (7% ester quat as softening active) are prepared with the different particles. Each type of particle includes the same materials for their respective wall polymers, primarily CN975 monomer.

The same perfume is used in each particle type, and each core also include approximately 40 wt % of partitioning modifier (i.e., isopropyl myristate). The particles are added in respective amounts to provide 0.158 wt % of perfume, by weight of the fabric enhancer product composition.

Cotton terry tracers are treated (in combination with a mixed fabric load) with the fabric enhancers in a short cotton cycle in an automatic washing machine (1200 rpm), with the fabric enhancer being added during the last rinse cycle. After the fabrics have been treated, expert perfumers perform an olfactive assessment for perfume intensity at the DRY and RUB touchpoints, and the scores at each touchpoint are averaged to give a score for that touchpoint. Scores are based on a perfume odor intensity scale from 0 to 100, where 0=no perfume odor, 25=slight perfume odor, 50=moderate perfume odor, 75=strong perfume odor, and 100=extremely strong perfume odor. To note, internal testing indicates that the advantages are not as evident at the wet touchpoint, nor on all fabrics. Additionally, headspace data is collected above the treated fabric using a solid phase microextraction (SPME) headspace approach with gas chromatography mass spectrometry (GCMS).

Descriptions of the delivery particles and the data results are provided below in Table 3. Leg Z includes delivery particles according to the present disclosure, whereas Legs W, X, and Y include comparative particles.

TABLE 3

| Delivery Particle Leg # | Approx. volume-weighted particle size (microns) | Core:wall polymer weight ratio | Olfactive Assessment DRY | Olfactive Assessment RUB | Headspace Analysis (nMol/L) DRY | Headspace Analysis (nMol/L) RUB |
|---|---|---|---|---|---|---|
| W (comp.) | 18 | 90:10 | 52.5 | 58.8 | 59 | 115 |
| X (comp.) | 18 | 98:2 | 55 | 61.3 | 67.9 | 102 |
| Y (comp.) | 36 | 90:10 | 50 | 56.3 | 49.2 | 68.8 |
| Z | 36 | 98:2 | 62.5 | 70 | 116 | 138 |

As indicated in Table 3, delivery particles having a relatively high core:wall polymer ratio (e.g., Legs X and Z, with 98:2 C:W ratio) generally outperform particles having a relatively lower ratio at one or both of the tested touchpoints.

Furthermore, by comparing the results of Leg Z to the results of Leg X, it is shown that delivery particles having a relatively larger particle size (e.g., 36 microns vs. 18 microns) perform relatively better at the indicated touchpoints.

Example 4. Exemplary Formulations—Liquid Fabric Enhancers

Table 4 shows exemplary formulations of compositions according to the present disclosure. Specifically, the following compositions are liquid fabric enhancer products.

TABLE 4

| | % Active (w/w) | | |
|---|---|---|---|
| Ingredient | Composition 1 | Composition 2 | Composition 3 |
| Quaternary ammonium ester material | 5% (Ester Quat 1)[1] | 7% (Ester Quat 2)[2] | 8% (Ester Quat 3)[3] |
| Delivery Particles* (w/encapsulated fragrance) | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.30% | 0.1% |
| Antifoam | 0.008% | 0.00% | 0% |
| Water | Balance | Balance | Balance |

[1] Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)
[2] Ester Quat 2: N,N-bis(hydroxyethyl)-N,N-dimethyl ammonium chloride fatty acid ester, produced from C12-C18 fatty acid mixture (REWOQUAT CI-DEEDMAC, ex Evonik)
[3] Ester Quat 3: Esterification product of fatty acids (C16-18 and C18 unsaturated) with triethanolamine, quaternized with dimethyl sulphate (REWOQUAT WE 18, ex Evonik)
*Delivery particles according to the present disclosure, e.g., Delivery Particle Ex. #1, Table 2, Example 2 above. The "% Active" provided is the amount of fragrance delivered to the composition.

Example 5. Exemplary Formulations—Laundry Additive Particles

Table 5 shows exemplary formulations of compositions according to the present disclosure. Specifically, the following compositions are laundry additive particles in the form of a pastille or "bead," for example commercially available products sold as DOWNY UNSTOPABLES™ (ex The Procter & Gamble Company).

TABLE 5

| Ingredient | Ex. 1 | Ex. 2 | Ex. 3 | Ex. 4 | Ex. 5 | Ex. 6 |
|---|---|---|---|---|---|---|
| Polyethylene Glycol MW 8000 [1] | 64% | 65% | 63% | 83.5% | 81.5% | 61% |
| Ester Quat [2] | 25% | 27% | 25% | — | — | 24% |
| CatHEC [3] | 3% | 3% | — | — | — | — |
| Perfume | — | — | — | 10.3% | 13.3% | 5% |
| Delivery Particles Slurry [4] | 8% | 4% | 12% | 5% | 5.2% | 10% |

[1] PLURIOL E8000 (ex BASF)
[2] Esterification product of fatty acids (C16-18 and C18 unsaturated) with triethanolamine, quaternized with dimethyl sulphate (REWOQUAT WE 18, ex Evonik)
[3] Cationically-modified hydroxyethylcellulose
[4] Fragrance delivery particles according to the present disclosure, e.g., the population formed in Example 1 above. The % provided is the amount of aqueous slurry provided to the composition, where the slurry comprises about 45 wt % of delivery particles (core + shell).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product composition comprising:
a treatment adjunct, and
a population of delivery particles,
wherein the delivery particles comprise a core and a polymer wall surrounding the core,
wherein the core comprises a benefit agent and a partitioning modifier,
wherein the partitioning modifier is present in the core at a level of from about 25% to about 50%, by weight of the core,
wherein the partitioning modifier comprises isopropyl myristate, wherein the benefit agent comprises a fragrance,
wherein the polymer wall comprises a (meth)acrylate polymer derived, at least in part, from one or more oil-soluble or oil-dispersible multifunctional (meth)acrylate monomers or oligomers,
the one or more oil-soluble or oil-dispersible multifunctional (meth)acrylate monomers or oligomers having four to six radical polymerizable functional groups,
with the proviso that at least one of the radical polymerizable groups is acrylate or methacrylate;
wherein the core and the polymer wall are present in a weight ratio of from about 98.2 to about 99:1; and
wherein the delivery particles are characterized by a volume-weighted median particle size from about 30 to about 40 microns.

2. The consumer product composition according to claim 1, wherein the radical polymerizable functional groups are each independently selected from the group consisting of acrylate and methacrylate.

3. The consumer product composition according to claim 1, wherein the oil-soluble or oil-dispersible multifunctional (meth)acrylate monomers or oligomers comprise a multifunctional aromatic urethane acrylate.

4. The consumer product composition according to claim 1, wherein the oil-soluble or oil-dispersible multifunctional (meth)acrylate monomers or oligomers comprise a hexafunctional aromatic urethane acrylate.

5. The consumer product composition according to claim 1, wherein the oil-soluble or oil-dispersible multifunctional (meth)acrylate monomers or oligomers comprise a multifunctional aliphatic urethane acrylate.

6. The consumer product composition according to claim 1, wherein the (meth)acrylate polymer is further derived from, at least in part, a monomer selected from an amine methacrylate, an acidic methacrylate, or a combination thereof.

7. The consumer product composition according to claim 1, wherein the (meth)acrylate polymer of the polymer wall is a reaction product derived from the oil-soluble or oil-dispersible multifunctional (meth)acrylate, a second monomer, and a third monomer.

8. The consumer product composition according to claim 1, wherein the (meth)acrylate polymer of the polymer wall is further derived from a water-soluble or water-dispersible mono- or multifunctional (meth)acrylate monomer or oligomer.

9. The consumer product composition according to claim 1, wherein the polymer wall of the delivery particles further comprise a polymeric emulsifier entrapped in the polymer wall.

10. The consumer product composition according to claim 1, wherein the (meth)acrylate polymer of the polymer wall is further derived, at least in part, from at least one free radical initiator.

11. The consumer product composition according to claim 10, wherein the free radical initiator is present in amount of from about 5% to about 40%, by weight of the polymer wall.

12. The consumer product composition according to claim 1, wherein the benefit agent is a fragrance.

13. The consumer product composition according to claim 1, wherein the partitioning modifier is isopropyl myristate.

14. The consumer product composition according to claim 1, wherein the partitioning modifier further comprises vegetable oil, modified vegetable oil, mono-, di-, and tri-esters of C4-C24 fatty acids, dodecanophenone, lauryl laurate, methyl behenate, methyl laurate, methyl palmitate, methyl stearate, or mixtures thereof.

15. The consumer product composition according to claim 1, wherein the population of delivery particles are characterized by an average Fracture Strength of from about 0.2 to about 10 MPa.

16. The consumer product composition according to claim 1, wherein the polymer wall of the delivery particles further comprises a coating material.

17. The consumer product composition according to claim 1, wherein the composition comprises from about 0.05% to about 20%, by weight of the composition, of the delivery particles.

18. The consumer product composition according to claim 1, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

19. The consumer product composition according to claim 1, wherein the composition is a fabric care composition, a hard surface cleaner composition, a dish care composition, a hair care composition, a body cleansing composition, or a mixture thereof.

20. The consumer product composition according to claim 1, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

21. A method of treating a surface, wherein the method comprises the step of contacting the surface with a consumer product composition according to claim 1, optionally in the presence of water.

* * * * *